(12) United States Patent
Song

(10) Patent No.: US 8,346,625 B2
(45) Date of Patent: *Jan. 1, 2013

(54) PROVIDING AUTOMATED GIFT REGISTRY FUNCTIONALITY TO ASSIST A USER IN PURCHASING AN ITEM FOR A RECIPIENT

(75) Inventor: Zhengrong Song, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/642,136

(22) Filed: Dec. 18, 2009

(65) Prior Publication Data

US 2010/0100455 A1    Apr. 22, 2010

Related U.S. Application Data

(63) Continuation of application No. 11/201,957, filed on Aug. 10, 2005, now Pat. No. 7,660,746, which is a continuation of application No. 09/528,087, filed on Mar. 17, 2000, now Pat. No. 7,580,861.

(51) Int. Cl.
*G06Q 30/00* (2012.01)
(52) U.S. Cl. ...................................... 705/26.7
(58) Field of Classification Search .................. 705/26.7
See application file for complete search history.

(56) References Cited

U.S. PATENT DOCUMENTS 5,754,981 A   5/1998   Veeneman et al.
(Continued)

FOREIGN PATENT DOCUMENTS

WO   0039738 A1   7/2000

OTHER PUBLICATIONS

WishClick, Inc., "Welcome to WishClick!," © 1999-2000, retrieved Feb. 23, 2000, from http://www.wishclick.com, 2 pages.

(Continued)

*Primary Examiner* — Susanna M Meinecke Diaz
(74) *Attorney, Agent, or Firm* — Seed IP Law Group PLLC

(57) ABSTRACT

A method, system, and computer-readable medium is described that provides automated gift registry functionality to assist a user in purchasing an item for a recipient. In particular, the system may track various information about a series of item purchases from one or more services through which items can be purchased. When such information about past item purchases is available, the system can then use the information to provide various automated gift registry functionality for users that want to purchase items for various recipients. Types of automated gift registry functionality provided by the system include making recommendations of items that are appropriate to be purchased for a specified recipient, assisting in preventing recipients from receiving inappropriate gift items by monitoring item gift purchases and item self-purchases, and responding to user requests to determine whether a specified gift would be appropriate for a recipient. In addition to information about past item purchases (e.g., whether a recipient has already received a copy of an item), the system can also use other information when determining whether a purchase of an item for the recipient is appropriate such as demographic information about the recipient or explicitly specified recipient preferences. Thus, for each type of gift registry functionality provided by the AGR system, a variety of types of tracked or retrieved information can be used when determining whether an item is appropriate for a recipient.

21 Claims, 19 Drawing Sheets

Warning: User <Name> has already received the item that you are about to purchase for them. Would you still like to proceed with the purchase?

[Yes]   [No]

U.S. PATENT DOCUMENTS

| | | | |
|---|---|---|---|
| 5,898,594 | A | 4/1999 | Leason et al. |
| 5,970,474 | A | 10/1999 | LeRoy et al. |
| 6,101,486 | A * | 8/2000 | Roberts et al. ............. 705/14.66 |
| 6,123,259 | A * | 9/2000 | Ogasawara .................... 235/380 |
| 6,249,774 | B1 | 6/2001 | Roden et al. |
| 6,386,450 | B1 | 5/2002 | Ogasawara |
| 6,556,975 | B1 | 4/2003 | Wittsche |
| 6,609,106 | B1 * | 8/2003 | Robertson .......................... 705/5 |
| 6,611,814 | B1 | 8/2003 | Lee et al. |
| 6,633,849 | B1 | 10/2003 | Dodd |
| 6,807,574 | B1 | 10/2004 | Partovi et al. |
| 7,013,292 | B1 | 3/2006 | Hsu et al. |
| 7,194,417 | B1 | 3/2007 | Jones |
| 7,222,087 | B1 * | 5/2007 | Bezos et al. ................ 705/26.81 |
| 7,580,861 | B1 * | 8/2009 | Song .......................... 705/26.35 |
| 7,660,746 | B1 * | 2/2010 | Song ............................ 705/26.4 |
| 2002/0095298 | A1* | 7/2002 | Ewing ................................ 705/1 |
| 2002/0133415 | A1 | 9/2002 | Zarovinsky |
| 2002/0143655 | A1 | 10/2002 | Elston et al. |
| 2003/0163390 | A1 | 8/2003 | Yang |
| 2005/0015336 | A1 | 1/2005 | Yeates et al. |
| 2005/0049925 | A1 | 3/2005 | Kataoka et al. |

OTHER PUBLICATIONS

NetGift Registry Incorporated, NetGift Registry—Main, © 1999, retrieved Feb. 23, 2000, from http://www.netgift.com/cgi-bin/ngr/index.jsp, 2 pages.

"Reminder/Gifted Solutions Announces Merchant and Portal Partners Using its New Gift Service Engine at Internet Commerce Expo This Week," Business Wire, Oct. 19, 1999.

Airline Automation Inc., "Predator," retrieved Aug. 5, 2005, from http://www.airauto.com/aai/predator/index.htm, 7 pages.

Airline Automation Inc., "Super Dupe Snooper SM," retrieved Aug. 5, 2005, from http://www.airauto.com/aai/dupesnoop/index.htm, 2 pages.

Henderson, D. "Turning Bookings into Passengers," Air Transport World, 2 pages, Sep. 1999.

Midwest Library Service, "InterACQ™," retrieved Aug. 5, 2005, from http://www.midwestls.com/; http://www.midwestls.com/Brochure/interacqtext.htm; and http://www.midwestls.com/Brochure/whattext.htm; 7 pages.

Sabre Airline Solutions ™, "Revenue Integrity Management," Copyright 2005, retrieved Aug. 5, 2005, from http://www.sabreairlinesolutions.com/products/operation/pdfs/SabreSonic_Rev_integrity_Mgmt.pdf, 8 pages.

"Smart Ticketing," Regional Airline World, 20(4):25, 26, 28, May 2003.

Gralla, Preston, "How the Internet Works," Millennium Ed., Que Corporation, Sep. 23, 1999.

White, Ron, "How Computers Work," Millenium Ed., Que Corporation, Sep. 22, 1999.

Muller, Nathan J., "Desktop Encyclopedia of the Internet," Artech House, Inc., 1998.

"Airlines Find Matchmaker," Jun. 2003, accessed Apr. 16, 2007, from http:///www.securitymanagement.com/library/001449.html, 4 pages.

"Clearcommerce Provides Superdrug with Healthy Transactions," Jun. 15, 2001, M2 Presswire, accessed Mar. 23, 2007, from http://proquest.umi.com/pqdweb?did=74236709&sid=5&Fmt=3&clientId=19649&RQT=309&VName+PQD, 2 pages.

* cited by examiner

Example transactions from 2/9/XX to 2/16/XX

01) User Bob purchases item ABC for himself on 2/9/XX, and it is delivered on 2/11/XX.

02) User Sally123 purchases item BCD for recipient Sam (a non-user) on 2/10/XX, and it is delivered on 2/11/XX.

03) User Sally123 purchases item CDE for herself on 2/10/XX, and it is delivered on 2/11/XX.

04) User Biff purchases item DEF for User Sally123 on 2/13/XX, and it is scheduled to be delivered on 2/27/XX.

05) User Sally123 purchases item EFG for herself on 2/13/XX, but cancels the order before it is delivered.

06) User John X. Smith purchases item FGH for User Sally123 on 2/13/XX, it is delivered on 2/14/XX, but User Sally123 returns the item on 2/15/XX.

*FIG.1B*

Item Purchase/Post-Purchase Table ~110

| Item Name | Item UID | Purchaser UID | Recipient UID | Time Of Purchase | Estimated Delivery Time | Actual Delivery Time |
|---|---|---|---|---|---|---|
| ABC | 0023 | 0182 | 0182 | 2/9/xx | 2/10/xx | 2/11/xx |
| BCD | 8318 | 0223 | 0855 | 2/10/xx | 2/11/xx | 2/11/xx |
| CDE | 0777 | 0223 | 0223 | 2/10/xx | 2/12/xx | 2/11/xx |
| DEF | 2569 | 3247 | 0223 | 2/13/xx | 2/27/xx | – |
| EFG | 9258 | 0223 | 0223 | 2/13/xx | 2/15/xx | CANCEL |
| FGH | 2379 | 5571 | 0223 | 2/13/xx | 2/13/xx | 2/14/xx RETURN |
| ... | | | | | | |

User 0223 Receipt Table ⟵ 120

| | Item Name | Item UID | Purchaser UID | Time Of Purchase | Estimated Delivery Time | Actual Delivery Time |
|---|---|---|---|---|---|---|
| 121 | CDE | 0777 | 0223 | 2/10/XX | 2/12/XX | 2/11/XX |
| 122 | DEF | 2569 | 3247 | 2/13/XX | 2/27/XX | – |
| 123 | FGH | 2379 | 5571 | 2/13/XX | 2/13/XX | 2/14/XX RETURN |
| | ... | | | | | |

User Table ⟵ 130

| | User UID | User Login | User Name(s) | User Email Address(es) | User Shipping Address(es) |
|---|---|---|---|---|---|
| 131 | 0182 | Bob | Robert A. White | bob@XXX.com | 1234 Main St., Great Bend, KS |
| 132 | 0223 | Sally123 | Sally Smith Jones, Sally Smith | sally@XYZ.com, sally123@ZZ.net | 1111 Oak Ln, Seattle, WA 2222 Corporate St., Bellevue, WA |
| 133 | 0855 | – | Sam | – | P.O. Box 9999, New York, NY |
| 134 | 3247 | Biff | Reginald Wadworth | reg@WW.com | – |
| | ... | | | | |

*FIG.1C/2*

Example transactions on 2/17/XX

07) User Sally123 begins to purchase item DEF for herself on 2/17/XX, but is warned that the item is being sent to her, so she terminates the purchase.

08) User Sally123 begins to purchase item CDE for herself on 2/17/XX, is warned that she previously purchased the item on 2/10/XX and received the item on 2/11/XX, but completes the transaction anyway with a scheduled delivery on 2/19/XX.

09) User Sally123 purchases item BCD for herself on 2/17/XX, and it is scheduled to be delivered on 2/21/XX.

10) User Biff begins to purchase item CDE for User Sally123 on 2/17/XX, but is warned that User Sally123 has previously received the item, and so terminates the purchase.

11) User Biff inquires on 2/17/XX if User Sally123 has previously received item HIJ, and is informed that User Sally123 has not received it.

12) User Biff requests recommendations on 2/17/XX of items to purchase for User Sally123, and receives recommendations of items based on the items User Sally123 has purchased for herself (e.g., CDE), purchased for others (e.g., BCD), and received from others (e.g., DEF). User Biff purchases one of the recommended items, item EFG, for User Sally123 on 2/17/XX.

*FIG. 1D*

Item Purchase/Post-Purchase Table ~110

| | Item Name | Item UID | Purchaser UID | Recipient UID | Time Of Purchase | Estimated Delivery Time | Actual Delivery Time |
|---|---|---|---|---|---|---|---|
| 111 | ABC | 0023 | 0182 | 0182 | 2/9/XX | 2/10/XX | 3/11/XX |
| 112 | BCD | 8318 | 0223 | 0855 | 2/10/XX | 2/11/XX | 2/11/XX |
| 113 | CDE | 0777 | 0223 | 0223 | 2/10/XX | 2/12/XX | 2/11/XX |
| 114 | DEF | 2569 | 3247 | 0223 | 2/13/XX | 2/27/XX | – |
| 115 | EFG | 9258 | 0223 | 0223 | 2/13/XX | 2/15/XX | CANCEL |
| 116 | FGH | 2379 | 5571 | 0223 | 2/13/XX | 2/13/XX | 2/14/XX RETURN |
| 141 | CDE | 0777 | 0223 | 0223 | 2/17/XX | 2/19/XX | – |
| 142 | BCD | 8318 | 0223 | 0223 | 2/17/XX | 2/21/XX | – |
| 143 | EFG | 9258 | 3247 | 0223 | 2/17/XX | 2/18/XX | – |

*FIG.1E/1*

User 0223 Receipt Table ~120

| Item Name | Item UID | Purchaser UID | Time Of Purchase | Estimated Delivery Time | Actual Delivery Time |
|---|---|---|---|---|---|
| CDE | 0777 | 0223 | 2/10/XX | 2/12/XX | 2/11/XX |
| DEF | 2569 | 3247 | 2/13/XX | 2/27/XX | — |
| FGH | 2379 | 5571 | 2/13/XX | 2/13/XX | 2/14/XX RETURN |
| CDE | 0777 | 0223 | 2/17/XX | 2/19/XX | — |
| BCD | 8318 | 0223 | 2/17/XX | 2/21/XX | — |
| EFG | 9258 | 3247 | 2/17/XX | 2/18/XX | — |
| ... | | | | | |

*FIG.1E/2*

User Table 130

| | User UID | User Login | User Name(s) | User Email Address(es) | User Shipping Address(es) |
|---|---|---|---|---|---|
| 131 | 0182 | Bob | Robert A. White | bob@XXX.com | 1234 Main St., Great Bend, KS |
| 132 | 0223 | Sally123 | Sally Smith Jones, Sally Smith | sally@XYZ.com, sally123@ZZ.net | 1111 Oak Ln, Seattle, WA 2222 Corporate St., Bellevue, WA |
| 133 | 0855 | – | Sam | – | P.O.Box 9999, New York, NY |
| 134 | 3247 | Biff | Reginald Wadworth | reg@WW.com | – |
| | ... | | | | |

FIG.1E/3

Warning: The item that you are about to purchase for yourself is already being sent to you from someone else. Would you still like to proceed with the purchase?

[Yes] [No]

*FIG.1F*

Warning: User <Name> has already received the item that you are about to purchase for them. Would you still like to proceed with the purchase?

[Yes] [No]

*FIG.1G*

Warning: You previously on <date> received the item that you are about to purchase for yourself. Would you still like to proceed with the purchase?

[Yes] [No]

— — — — — — — — — —

Warning: You previously on <date> returned the item that you are about to purchase for yourself.

— — — — — — — — — —

Warning: You previously on <date> canceled an order for the item that you are about to purchase for yourself.

*FIG.1H*

Warning: It is possible that User <Name> does not want the item that you are about to purchase for them. Would you still like to proceed with the purchase?

[Yes] [No]

— — — — — — — — — —

Warning: User <Name> previously on <date> returned a copy of the item that you are about to purchase for them

*FIG.1I*

PROVIDING AUTOMATED GIFT REGISTRY FUNCTIONALITY TO ASSIST A USER IN PURCHASING AN ITEM FOR A RECIPIENT

CROSS-REFERENCE TO RELATED APPLICATIONS

This application is a continuation of co-pending U.S. patent application Ser. No. 11/201,957, filed Aug. 10, 2005, which is hereby incorporated herein by reference, and which is a continuation of U.S. patent application Ser. No. 09/528,087, filed Mar. 17, 2000, now U.S. Pat. No. 7,580,861 issued Aug. 25, 2009.

TECHNICAL FIELD

The following disclosure relates generally to assisting a user in ordering an item, and more particularly to automatically assisting a user in purchasing an item for a recipient.

BACKGROUND

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Many Web servers have been developed through which vendors can advertise and provide items. The item can be products that are delivered electronically to the purchaser over the Internet (e.g., music) and products that are delivered through conventional distribution channels (e.g., books delivered by a common carrier). Similarly, the items can also be services that are provided either electronically (e.g., providing email service) or physically (e.g., performing cleaning services at the house of the purchaser). While the purchaser of an item typically obtains full ownership of the item, other types of purchase transactions can also be executed such as renting, leasing, trying an evaluation copy of an item for free for a limited time, licensing, bartering, and exchanging.

A server computer system that is providing a service through which items can be purchased may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

The selection of the various items from the electronic catalogs is generally based on the "shopping cart" model. When the purchaser selects an item from the electronic catalog, the server computer system metaphorically adds that item to a shopping cart. When the purchaser is done selecting items, then all the items in the shopping cart are "checked out" (i.e., ordered) when the purchaser provides billing and shipment information. In some models, when a purchaser selects any one item, then that item is "checked out" by automatically prompting the user for the billing and shipment information. Although the shopping cart model is very flexible and intuitive, it has a downside in that it requires many interactions by the purchaser. For example, the purchaser selects the various items from the electronic catalog, and then indicates that the selection is complete. The purchaser is then presented with an order Web page that prompts the purchaser for the purchaser-specific order information to complete the order. That Web page may be pre-filled with information that was provided by the purchaser when placing another order. The information is then validated by the server computer system, and the order is completed. Such an ordering model can be problematic for multiple reasons. If a purchaser is ordering only one item, then the overhead of confirming the various steps of the ordering process and waiting for, viewing, and updating the purchaser-specific order information can be much more than the overhead of selecting the item itself. This overhead makes the purchase of a single item cumbersome. Also, with such an ordering model, each time an order is placed sensitive information is transmitted over the Internet. Each time the sensitive information is transmitted over the Internet, it is susceptible to being intercepted and decrypted.

Some Web sites provide Web-based gift registry functionality (e.g., www.wishclick.com and www.netgift.com) in which user can manually specify indications of items which they are interested in receiving, such as a "wish list" of desired items. Other users that desire to give a gift to that user can view the user's wish list, and then purchase an item from the list for the user. When using such wish lists, the gift recipient is more likely to receive appropriate gifts that they desire, and a gift giver is more likely to be able to provide such gifts to the recipient. Moreover, some Web sites may additionally track the items that gift givers purchase for the recipient, and automatically remove those items from the wish list when they are purchased.

While such wish lists can provide various benefits, they also have various problems. A significant problem for a gift giver is that gift registry functionality can only be provided if an intended recipient has manually created a wish list, and only a small fraction of Web users typically create such wish lists. Moreover, even if an intended recipient has created a wish list on a particular Web site, there is no easy way for the gift giver to locate that wish list. In addition, if a user's wish list is kept up-to-date, the wish list can lead to the user receiving inappropriate gifts (e.g., multiple copies of an item for which only one was desired, or an item that was desired by the user when it was added to the wish list but is no longer desired). Thus, a variety of problems exist with the current use of wish lists.

BRIEF DESCRIPTION OF THE DRAWINGS

FIGS. 1A-1I provide examples of a variety of item purchase transactions, and of how previous item purchase transactions are used to provide automated gift registry functionality for future item purchase transactions.

DETAILED DESCRIPTION

Figure 1A:
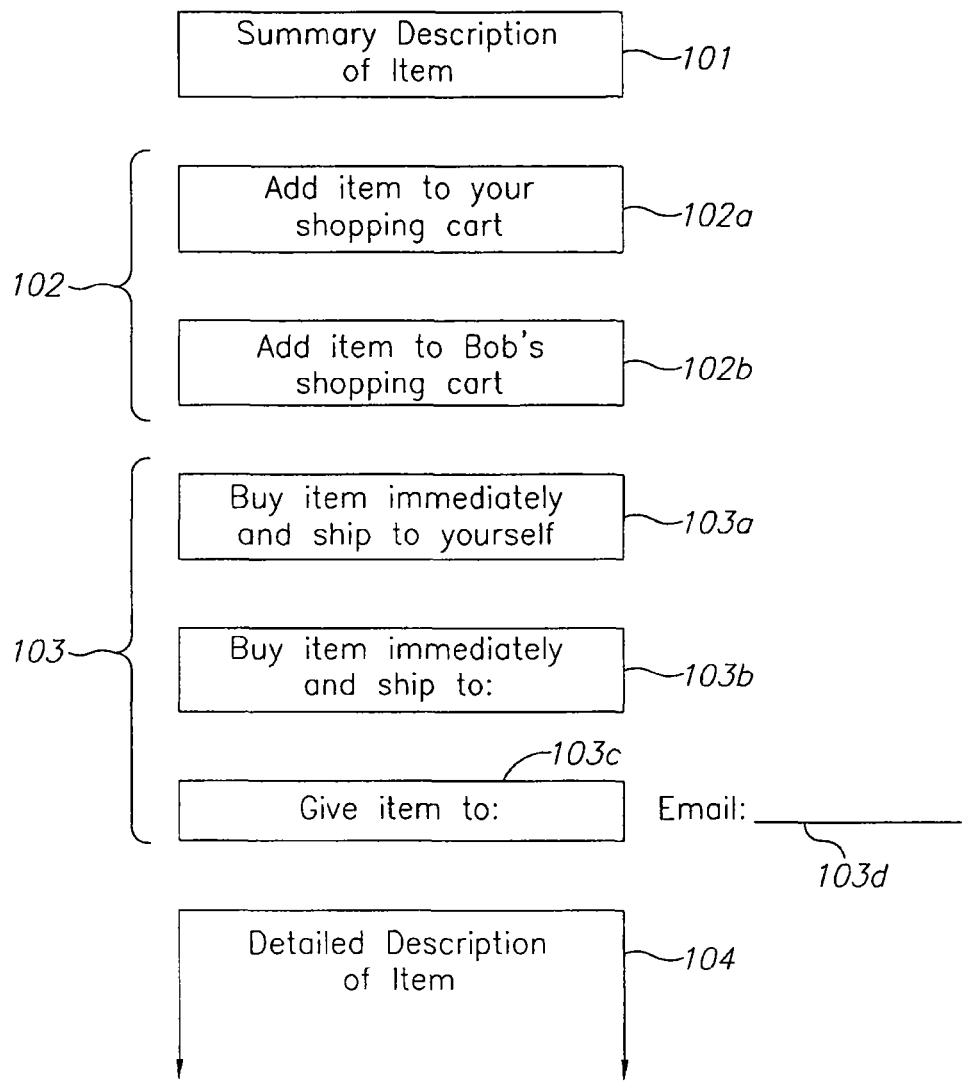

A method, system and computer-readable medium is described below that provides automated gift registry functionality to assist a user in purchasing an item for a recipient. In particular, in some embodiments the Automated Gift Registry (AGR) system tracks various information about a series of item purchases from one or more services through which items can be purchased (e.g., Web-based e-commerce sites such as www.Amazon.com). The tracked information can include information about items purchased by the recipient for himself or herself (i.e., self-purchases), about items that the recipient has purchased for others (i.e., gifts), and about items that others have purchased for the recipient as gifts. The tracked information can include not only purchasers and recipients of the items, but also additional information such as the time of the purchase, the time that the item is delivered to the recipient, the number of copies of the item that a recipient has received, and information about post-purchase activities related to the item (e.g., the return of the item after it was delivered, the cancellation of the order for the item before delivery, a review of the item by the recipient, etc.).

When such tracked information about past item purchases is available, the AGR system can then use the information to provide various automated gift registry functionality for users that want to purchase items for various recipients. For example, some embodiments of the AGR system can provide item gift recommendations for a recipient based on past purchases made by the recipient or for the recipient. Other embodiments of the AGR system can receive an indication that a user is about to order an item for a recipient, and can warn the user if the item is not appropriate for the recipient (e.g., if the recipient has already received the item). Yet other embodiments of the AGR system can receive a request from a user as to whether an item is appropriate for a recipient, and can indicate to the user the appropriateness of the item. Thus, the AGR system can assist users in purchasing an appropriate gift for a recipient without requiring the recipient to manually specify any information about item appropriateness.

Recommendations of items that are appropriate to be purchased for a specified recipient can be automatically generated in a variety of ways. For example, in one embodiment the AGR system can recommend as possible appropriate gifts for the recipient both items that are similar or related to the items that the recipient has already received (whether as gifts or self-purchases), and items that the recipient has purchased as gifts for others. Techniques for generating gift recommendations are discussed in greater detail below, and generating gift recommendations is also discussed generally in commonly-assigned co-pending U.S. patent application Ser. No. 09/104,942, filed Jun. 25, 1998, which is hereby incorporated by reference.

Similarly, recipients can be automatically prevented from receiving inappropriate items in a variety of circumstances, such as by warning a user placing an order for an inappropriate item or by responding to a user request as to whether a specified item would be appropriate as a gift for a recipient. An inappropriate item is generally one which a recipient would not like to receive, such as any copies of some items (e.g., a toy designed for a 5-year old when the recipient is 10 years old), more than 1 copy of other items (e.g., a typically non-replenishable item such as a CD or book), or more than a given number of other items (e.g., 8 sets of silverware). In one embodiment, if an order is placed to purchase an item as a gift for a recipient, and if the item has previously been purchased for the recipient, then the user placing the gift order can be warned or prevented from completing the order. In another embodiment, if an order is placed by a user for an item self-purchase, and if another user has previously purchased the item as a gift for the user but the user is not yet aware of the gift, then the user can be warned or prevented from completing the self-purchase. Various other techniques for preventing recipients from receiving inappropriate items are discussed in greater detail below.

In some embodiments, the AGR system may perform additional processing when determining whether an item is appropriate for a recipient. For example, before warning a user about purchasing an item for a recipient that was previously purchased for them, the AGR system may be able to determine if the recipient is likely to want to receive multiple copies of the item. The number of copies of an item that a recipient is likely to want to receive is discussed in greater detail below, as well as in commonly-assigned co-pending provisional U.S. Patent Application No. 60/169,721, entitled "Automatically Initiating Product Replenishment;" filed Dec. 8, 1999, which is hereby incorporated by reference. Similarly, when a user is ordering an item as a self-purchase, before warning the user about a purchase order of the item with a pending delivery, the AGR system may be able to determine whether a user is likely to be aware of the pending purchase order.

The AGR system can also use information other than previous item purchases when determining whether a purchase of an item for the recipient is appropriate. For example, demographic information about the recipient or explicitly specified recipient preferences can also be used to determine the appropriateness of an item. Thus, for each type of gift registry functionality provided by the AGR system, a variety of types of tracked or retrieved information can be used when determining whether an item is appropriate for a recipient.

FIGS. 1A-1I provide examples of a variety of item purchase transactions, and of how previous item purchase transactions can be used to provide automated gift registry functionality for future item purchase transactions. The examples are provided for illustrative purposes only, and are net intended to limit the scope of the invention. FIG. 1A first illustrates an exemplary Web page via which an item may be purchased by a user, such as may be provided by an item purchase service. FIG. 1B next describes an exemplary series of item purchase transactions, and FIG. 1C illustrates various exemplary purchase information that may be tracked for the series of item purchase transactions. FIG. 1D then describes examples of how the AGR system can use the information from the first series of item purchase transactions to provide various automated gift registry functionality during a second series of item purchase transactions. FIG. 1E illustrates the various exemplary tracked purchase information after the second series of item purchase transactions. Finally, FIGS. 1F-1I illustrate examples of various warnings that may be provided to a user by the AGR system.

With respect to FIG. 1A, the Web page displayed is sent in the illustrated embodiment from a server system to a client system when the user of the client system requests to review detailed information about an item. This example Web page contains a summary description section 101, a shopping cart section 102, in expedited ordering section 103, and a detailed description section 104. The summary description and the detailed description sections provide information that identifies and describes an item that may be purchased. The shopping cart section and expedited ordering section provide various alternatives for a user to place an order to purchase the item. In particular, the shopping cart section provides a conventional capability to add the described item to an electronic shopping cart. If the server system has information available to allow expedited ordering for the user (e.g., billing and shipping information), the server system can make one or more expedited ordering selections available to the user. If so, the user can then purchase the item without using a shopping tart by instead using one of these selections. One skilled in the art will appreciate that these various sections can be omitted or rearranged or adapted in various ways for an item purchase Web page. The user need only be aware of the item or items to be purchased, and of an action (e.g., a single action) needed to place an order to purchase the item. One skilled in the art will also appreciate that a server system may selectively include or exclude various sections of a particular Web page before sending the Web page to the client system, such as based on the user requesting the Web page.

In the illustrated embodiment, the shopping cart section 102 includes two selections 102a and 102b. Selection 102a provides to the user the ability to add the item to the user's default or standard shopping cart. Selection 102b corresponds to the user adding the item to a shopping cart defined to hold gifts for a recipient named Bob (e.g., the user's son). Those skilled in the art will appreciate that an item purchase Web page may include any number of shopping cart selections, including multiple shopping cart selections for self-purchases (e.g., differentiated based on work and home addresses, on different billing mechanisms, to track different types of items, etc.), multiple shopping cart selections for gifts (e.g., based on the recipient, on the holiday, etc.), or no shopping cart selections.

In the illustrated embodiment, the expedited ordering section 103 also includes multiple selections, those being 103a, 103b, and 103c. If procurement information is available for the user that is sufficient to purchase and deliver the item, the user can purchase the item as a self-purchase with a single action by merely selecting the 103a selection. Similarly, if procurement information is available for multiple different purchase options (e.g., to different recipients, to different addresses for a self-purchase, using different billing information, etc.), the user can purchase the item by selecting the 103b selection. In response, the user will receive an indication of the multiple different purchase options that are available, and can then select one of those purchase options. Yet another manner of purchasing the item in the illustrated embodiment involves the user selecting the 103c gift selection and specifying an email address of the gift recipient at text input field 103d. In this alternative, the system will determine an appropriate address for delivering the item to the recipient (e.g., the email address if the item can be electronically delivered, and a physical address if electronic delivery is not available), and will use pre-specified billing information to complete the order. Various methods for purchasing an item are described in greater detail in commonly-assigned, co-pending provisional U.S. Patent Application No. 60/171,947, filed Dec. 23, 1999, which is hereby incorporated by reference.

FIG. 1B next describes an exemplary series of item purchase transactions. As is illustrated in greater detail in FIG. 1B, a series of six example transactions occurred between 2/9/XX and 2/16/XX, such as occur when interacting with an item purchasing service. During the first four transactions, user Bob purchases item ABC for himself, user Sally123 purchases item BCD for Sam, user Sally123 purchases item CDE for herself, and user Biff purchases item DEF for user Sally123. The first three items were delivered by 2/16/XX, and the fourth item is scheduled for delivery on 2/27/XX. In the fifth transaction, user Sally123 purchases item EFG for herself, but cancels the order before the item is delivered. In the sixth transaction, user John. X. Smith purchases item FGH for user Sally123, but user Sally123 returns the item after it is delivered to her.

FIG. 1C illustrates various exemplary purchase information that may be tracked for the series of item purchase transactions illustrated in FIG. 1B. In particular, FIG. 1C illustrates three example database (DB) tables, those being Item Purchase/Post-Purchase (PPP) table 110, User table 130, and User 0223 Receipt table 120. In particular, the Item PPP table contains a variety of information about each item purchase and about post-purchase activity related to the item, with entries 111-116 corresponding to the example transactions 01-06 illustrated in FIG. 1B. As is shown, in the illustrated embodiment the Item PPP table includes columns that reflect the item name for the item that has been purchased, a unique identifier (UID) for the item, a UID for the purchaser to of the item, a UID for the recipient of the item, an indication of the time of purchase, an indication of the estimated delivery time, and an indication of the actual delivery time.

Those skilled in the art will appreciate that a variety of other types of purchase and post-purchase information can be tracked, and that the tracked information can be stored and structured in a variety of ways. For example, in the illustrated embodiment, all of the post-purchase information is reflected in the column for actual delivery time, while in other embodiments no post-purchase information may be tracked, or instead each type of post-purchase information may be tracked in a different column. Thus, in the illustrated embodiment, entry 114 in the table does not have a value for the actual delivery time column since delivery has not yet occurred for purchase transaction 04. Similarly, entry 115 reflects a value of CANCEL for the actual delivery time since the item purchase was canceled, and entry 116 includes both the time that the item was delivered and an indication that the item was later returned (without an indication of the return time). In addition, in other embodiments the same types of item purchase information could be grouped in other ways.

For example, the post-purchase information could be stored in a separate database table than the purchase information, and purchase information could be stored in a separate table for each purchaser or for each item type.

Since users can be identified in a variety of ways in the illustrated embodiment (e.g., by name, shipping address, user login name for an item purchase service, email address, etc.), each person is identified in the Item PPP table with a UID. These UIDs are then mapped in the User table to the various information that is available for each person. In particular, the illustrated User table includes columns for containing a user UID, a user login name, one or more actual names for the user; one or more email addresses for the user, and one or more shipping addresses for the user. A variety of other types of information could also be stored, such as billing information and delivery instructions. Much of this information may be gathered by the item purchase service when a person first registers as a user of the service. When an item is purchased in the illustrated embodiment for a recipient that is not a user, the item purchase service or the AGR system gathers some or all of this information for that recipient at that time. For example, in item purchase transaction 02, item BCD was purchased by user Sally123 for non-user Sam. At that tune, user Sally 123 entered delivery information for Sam, and entry 133 in the User table was created including a UID that was created for Sam and his delivery P.O. Box.

The item names and item UIDs shown in the Item PPP table may be determined for an item purchase transaction in a variety of ways. In the illustrated embodiment, the item UID is included as part of the user request to purchase an item (e.g., by being included as part of the item purchase Web page that is used to generate the order). The item name can similarly be included in the purchase order from the user, or that and various other information about the item could be retrieved from another table in the database, such as an Item table (not shown).

As indicated above, in some embodiments each user could have a separate table in which to store item purchase information for items purchased by that user. Similarly, information about each item received by a user could be stored in a separate table. In the illustrated embodiment, receipt information (i.e., estimated and actual delivery times) is stored in the Item PPP table, but a table with the item receipt information for a particular user can be extracted from the Item PPP table. For example, User 0223 Receipt table is a table showing the items received by user 0223 (i.e., Sally123) that has been extracted from the Item PPP table. In the example User Receipt table shown, all of the columns of the Item PPP table are included in the User Receipt table other than the Recipient UID column. Those skilled in the art will appreciate that other types of tables could be extracted from the Item PPP table, such as a User Purchase table, or separate User Self-Purchase and User Gift Purchase tables.

FIG. 1D next describes examples of how the AGR system can use the information from the first series of item purchase transactions to provide various automated gift registry functionality during a second series of item purchase transactions, and FIG. 1E illustrates the various exemplary tracked purchase information for the second series of item purchase transactions. As is illustrated in FIG. 1D, a series of six example transactions (07-12) occur on 2/17/XX. In the first transaction, numbered 07, user Sally123 begins to purchase (e.g., places an order for) item DEF a self-purchase. The AGR system is notified of the order (e.g., by monitoring all orders that occur, or by receiving an indication of the order from the item purchase service), and determines whether the self purchase is appropriate based on the previous purchases that have been tracked. In particular, the AGR system notes that item DEF has been ordered for Sally123 by another user, but has not yet been delivered to Sally123.

Since is likely that Sally123 does not know that she is about to receive the item, the AGR system next determines whether it is likely that Sally123 would want to receive two copies of item DEF in rapid succession. This determination could be made in a variety of ways, such as a general determination based on the type of the item, an item-specific determination (e.g., stored in the Item table), user preferences previously expressed by Sally123, etc. After the AGR system determines that is unlikely that Sally123 knows that she is about to receive another copy of item DEF and that is unlikely that she would like to receive two copies of the item in rapid succession, the AGR system warns Sally123 that item DEF is being sent to her. At that time, Sally123 opts to terminate the order for item DEF before it is completed. Since the order was terminated before it was completed, no entry is added to the Item PPP table for this transaction.

In alternate embodiments, the AGR system can determine whether to warn Sally123 based on other factors, such as warning her any time there is an order pending for her to receive the item she is ordering as a self-purchase, regardless of whether it is likely that she would like to receive multiple copies of the item or whether it is likely that she knows of the pending order. Conversely, in some embodiments the AGR system may automatically terminate the pending order or the order being placed rather than warning the user. In addition, in some embodiments the AGR system will attempt to provide only the minimal amount of information necessary about purchases made by ether users in order to protect the privacy of those users (and to maintain surprise about gifts to be received). Thus, while the AGR system could include information in the warning such as the user that purchased the item for Sally123 and the expected date of delivery, in the illustrated embodiment Sally123 is told only that an order is pending.

In the second transaction illustrated in FIG. 1D, numbered 08, user Sally123 begins to purchase item CDE as a self-purchase. The AGR system is notified of the order, and determines that Sally123 had previously ordered item CDE as a self purchase on 2/10/XX and received the item on 2/11/XX. While it is possible that Sally123 intended to order two copies of the item (e.g., the first item may have broke, or it may be a type of item such as a juggling pin in which multiple copies are typically needed), the AGR system warns Sally123 of the earlier purchase in case she merely forgot that she recently purchased the item. After receiving the warning, Sally123 completes the transaction anyway, and an estimated delivery date of 2/19/XX is assigned to the order. The entry 141 is then added to the Item PPP table to represent this transaction, as is shown in FIG. 1E. The transaction is also represented in the User 0223 Receipt table as entry 151, which may be added automatically as soon as entry 141 is created or may instead be added only after the User Receipt Table is, manually regenerated. In some embodiments, the AGR system will attempt to provide as much information as possible about previous self-purchases in order to assist the user in determining whether to complete the current transaction. Thus, the AGR system may indicate information to Sally123 such as the previous date of purchase and of delivery, as well as any determinations made about the appropriateness of receiving multiple copies of the item.

In the next transaction illustrated in FIG. 10, numbered 09, user Sally123 begins to purchase item BCD as a self-purchase. The AGR system is notified of the order, and determines that there is no reason to warn Sally 123 about the purchase. In particular, the AGR-system notes that Sally123 had previously purchased item BCD for another user as a gift (shown in entry 112), but does not have an actual or pending receipt of the item herself. Similarly, there are no other reasons to believe that Sally123 would find the item BCD inappropriate, such as a preference that was previously manually specified or a preference that was automatically determined (e.g., based on demographic information available about Sally123). Since Sally123 is not warned, she completes the transaction, and the transaction is represented by entry 142 in the Item PPP table and entry 152 in the User 0223 Receipt table.

In the next transaction illustrated in FIG. 1D, numbered 10, user Biff begins to purchase item CDE for User Sally123. The AGR system is notified of the order, and determines that user Sally123 had previously received item CDE on 2/11/XX and also has a pending order for item CDE that is estimated to be delivered on 2/19/XX. After the AGR system determines that it is unlikely that Sally123 would like to receive yet another copy of item CDE based on her receiving two of the items), the system warns user Biff that Sally123 has previously received the item. In response, Biff terminates the order; and thus the item purchase transaction is not reflected in the Item PPP table. In some embodiments, the AGR system will attempt to provide only the minimal amount of information necessary about purchases made by other users in order to protect the privacy of those users. Thus, while the AGR system could indicate information such as Sally123 having previously ordered two copies of the item as self-purchases on specified dates and with specified delivery times, in the illustrated embodiment Biff is told only that Sally123 has previously received the item. In the illustrated embodiment, Biff would receive the same warning even if the item purchase transaction 03 had not occurred (and thus Sally123 was still waiting to receive item CDE from the pending item purchase transaction 08).

In the next transaction illustrated in FIG. 1D, numbered 11, user Biff inquires if user Sally123 has previously received item HIJ. The AGR system is notified of the inquiry, and determines that user Sally123 has not previously received the item and that there are no pending orders for her to receive the item. Thus, the system indicates to user Biff that user Sally123 has not received the item, but Biff decides not to complete the order. In alternate embodiments, information that is provided in response to such queries may vary in a variety of ways, such as not providing such information to anyone, or providing such information only to, certain users or based on specified preferences of the potential recipient. If such information is provided, in some embodiments the AGR system will attempt to provide only the minimal amount of information necessary about previous purchases or receipts of other users.

In the last transaction illustrated in FIG. 1D, user Biff requests recommendations of gift items that are appropriate to be purchased for user Sally123. The AGR system is notified of the inquiry, and generates a list of one or more items as gift recommendations for Sally123. In particular, the AGR system reviews the tracked item purchase information and determines items that Sally123 has previously purchased as self-purchases, has previously purchased as gifts for other recipients, and has received as gifts from others. The system can then use this information to generate a list of recommendations in a variety of ways. For example, the system could use items that Sally123 has purchased as gifts for others (e.g., item BCD) as possible gifts for her. In addition, the system could determine items that are related or similar to items that have been ordered for her (whether self-purchases or gifts), and could use those determined items as possible gifts for her. Moreover, the system could also remove any items that Sally123 has already received or for which a pending order exists (e.g., item BCD) from this list before providing it to Biff. After receiving the list of recommendations, Biff decides to purchase item EFG for Sally123, and the transaction is represented by entry 143 in the Item PPP table and entry 153 in the User 0223 Receipt table.

In some embodiments, the system may be able to use additional information to determine appropriate gifts for Sally 123. For example, Sally123 may have previously expressed information indicating her preferences about receiving or not receiving various gifts (e.g., on a wish list). This preference information could vary in a variety of ways, such as by item type, range of dates, price range, purchaser, or occasion. Another type of information that the system may be able to use when generating recommendations for Sally123 includes demographic information about her. For example, the system may determine to eliminate male-specific items (e.g., men's underwear) from Sally123's recommendation list. Similarly, the system can use age information to determine appropriate gifts. For example, if Sally123 is a minor, items such as cigarettes or alcohol may be eliminated and items such as age-appropriate toys or books could be added. In addition, if a significant amount of time had passed since preference information such as a wish list was specified, changes in demographic information (e.g., age) could be used to automatically adjust items included on the list. In addition to using demographic information to modify recommendations on a per user basis, items determined to be appropriate for a demographic group (e.g., single Protestant Asian women between the ages of 25 and 35 with disposable incomes greater than $50,000 dollars) could also be added to the recommendation list. Other types of information that can be used by the system include information about post-purchase activities for previously tracked items. For example, if user Sally123 has returned an item, that may be relevant information about whether the item is appropriate for Sally123 (e.g., she may not want that item, or she may have wanted the item enough to order it but received a defective copy). Similarly, if user Sally123 has canceled an order for an item, that information could also be relevant to the system about whether the item is appropriate. Those skilled in the art will appreciate that a variety of other types of information could be used to determine whether an item is appropriate for a recipient.

As described above, FIG. 1E illustrates the various exemplary tracked purchase information after the second series of item purchase transactions. In particular, the Item PPP table contains new entries 141-143 corresponding to example transactions 08, 09, and 12 illustrated in FIG. 1D. Similarly, the User 0223 Receipt table contains new entries 151-153 corresponding to entries 141-143.

FIGS. 1F-1I illustrate examples of various warnings that may be provided to a user by the AGR system. Those skilled in the art will appreciate that the specific information provided can vary in a variety of ways, and that warnings can be generated in a variety of circumstances. For example, the amount of information provided may vary based on factors such as previously specified recipient preferences, a particular event for which a gift is being purchased (e.g., a birthday, wedding, or Christmas), a particular gift-giver (e.g., a spouse versus a co-worker), etc. With respect to FIG. 1F, a warning is shown that may be presented to a user attempting to purchase an item as a self-purchase when a pending purchase of the item exists such that the item has already been ordered but not delivered to the user (e.g., user Sally123 in transaction 07). A query as to whether the user would like to proceed with the purchase is also shown.

With respect to FIG. 1G, a warning is shown that may be presented to a user attempting to purchase an item, as a gift for a recipient who already has the item or who has a pending order for the item (e.g., user Biff in transaction 10), along with a query as to whether the user would like to proceed with the purchase. In FIG. 1H, three example warnings are shown about previous user activities with respect to an item that a user is attempting to acquire as a self-purchase. The first warning shown indicates that the user previously received the item on a specified date, and queries the user as to whether or not to proceed with the purchase. The second warning shown indicates that the user previously returned the item on a specified date, and the third warning shown indicates that the user previously canceled an order for the item on a specified date. Finally, with respect to FIG. 1I, two warnings are shown that may be presented to a user attempting to purchase an item as a gift for a recipient when the item is not appropriate for the recipient. The first warning does not indicate to the user why the item is inappropriate, while the second warning indicates that the recipient previously returned a copy of the item on a specified date.

Figure 2:
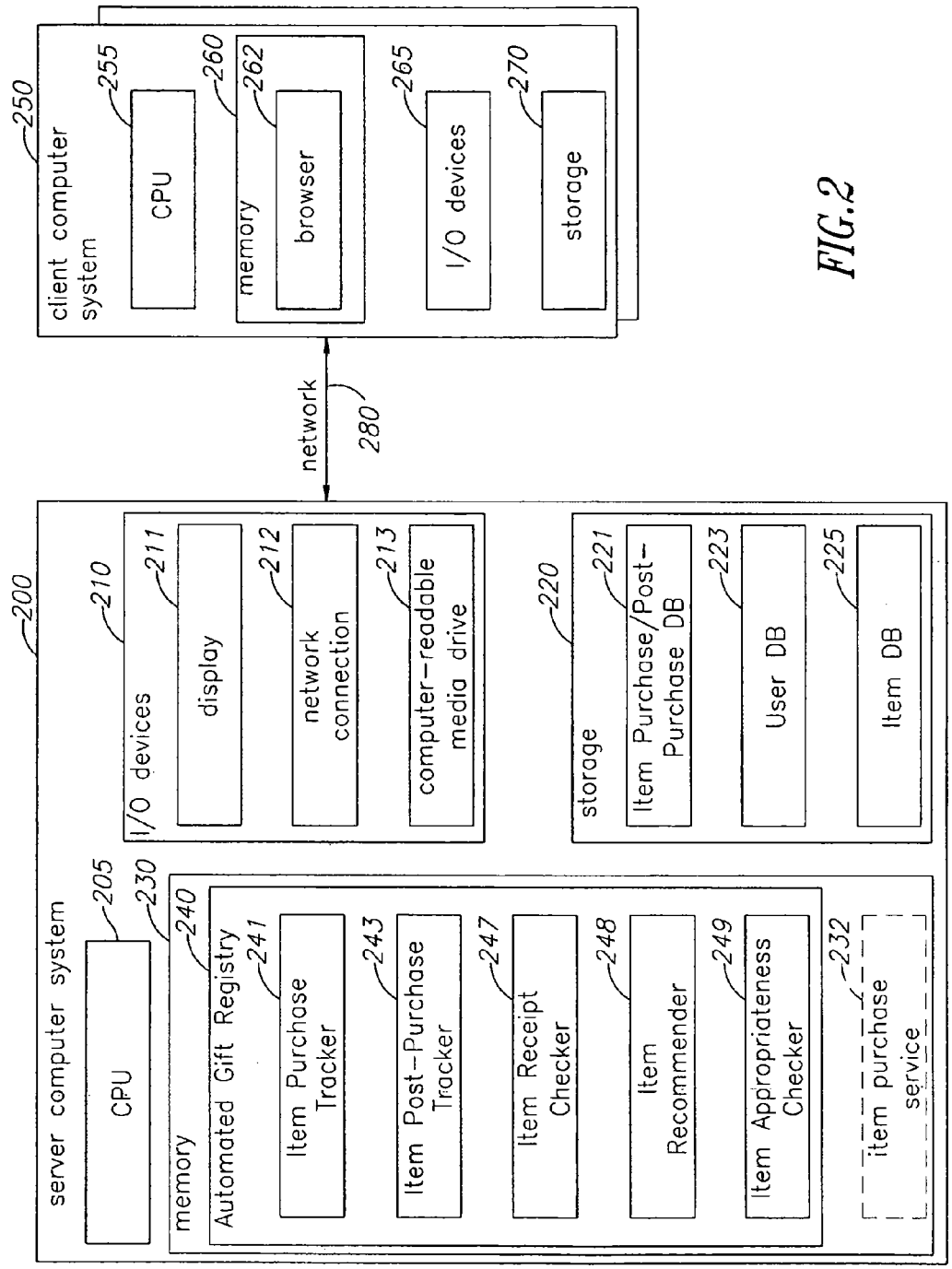
FIG. 2 is a block diagram illustrating an embodiment of the Automated Gift Registry system.

FIG. 2 illustrates a server, computer system 200 which is suitable for executing an embodiment of the AGR system, as well as multiple client computer systems 250 which can request and receive automated gift registry functionality from the AGR system. In the illustrated embodiment, the server computer system also optionally provides an item purchase service from which users of the client computer systems can purchase items. In particular, the server computer system includes a CPU 205, various input/output (I/O) devices 210, storage 220, and memory 230. The memory includes executing copies of an embodiment of the AGR system 240 and of an item purchase service 232. The illustrated I/O devices include a display 211, a network connection 212, and a computer-readable media drive 213 through which the server computer system can communicate with users and with other computer systems. Each of the client computer systems similarly include a CPU 255, memory 260, various I/O devices 265, and storage 270.

In the illustrated embodiment, the AGR system tracks information about various item purchases that occur, and uses the tracked information to provide various automated gift registry functionality to clients. In other embodiments, separate components may perform the tracking of the information and the providing of the automated gift registry functionality, or different components may each provide a different type of gift registry functionality. Item purchases can occur when a user of one of the client computer systems contacts an item purchase service to place an order for an item, such as by using a browser application 262 executing in the memory 260 to order an item from the item purchase service 232.

In order to track information about various item purchases, the executing AGR system interacts with item purchase services in order to receive information about item purchases. In particular, the Item Purchase Tracker component 241 is notified when an item purchase occurs from an item purchase service, such as the item purchase service 232 or an item purchase service executing on another computer system (not shown). The Item Purchase Tracker can be notified of an item purchase in a variety of ways, such as by periodically requesting item purchase information from an item purchase service, retrieving item purchase information from a database maintained by an item purchase service, or being notified automatically by an item purchase service when an item purchase occurs. Those skilled in the art will appreciate that the AGR system may operate as part of an item purchase service, on the same server computer system as the item purchase service, that the AGR system may execute on a computer system that does not provide an item purchase service, or that a single AGR system may track information from and provide automated gift registry functionality in conjunction with multiple such item purchase services.

When notified of the purchase of an item, the Item Purchase Tracker stores various information about the purchase by creating an entry in the Item Purchase/Post-Purchase (PPP) DB table 221 on storage 220 that represents the item purchase. As previously described, the Item PPP table can include a variety of types of information about an item purchase. In a similar manner, the Item Post-Purchase Tracker component 243 is notified when post-purchase activity occurs (e.g., the order is canceled, the item is delivered to and received by the recipient, a previously delivered item is returned, etc.) that is related to a previous item purchase, and then stores various information about the activity in the Item PPP table entry corresponding to the item purchase. When tracking and storing various information, the AGR system may retrieve information stored in various database tables, whether created by the AGR system or by an item purchase service, such as User table 223 and Item table 225 on storage 220.

When tracked item purchase information is available, the AGR system can provide various types of automated gift registry functionality, either directly to the client computer systems or in conjunction with one or more item purchase services. In particular, the Item Receipt Checker 247 can determine whether a specified recipient has previously received a specified item, as well as if a pending order exists for the specified item to be delivered to the specified recipient. In some circumstances, the existence of one or more such previous or pending orders can cause the potential purchaser to be warned or prevented from completing the possible purchase. The Item Receipt Checker can be invoked in a variety of circumstances, such as in response to an explicit request from a client to determine whether a recipient does not yet have a particular item, or as part of the monitoring of ongoing item purchases (both self-purchases and gifts).

The AGR system can also use tracked item purchase information to automatically provide gift recommendations for a specified recipient. In particular, the Item Recommender component 248 can determine items that the specified recipient has previously received (both as self-purchases and as gifts) and items that the specified recipient has purchased for others as gifts. The Item Recommender can then use this information to generate gift recommendations, such as by selecting items related to or similar to items that the specified recipient has already received. As discussed in greater detail elsewhere in this document, the Item Recommender can also use other types of information when automatically generating gift recommendations. The Item Recommender, can also generate and provide gift recommendations in various circumstances, such as based on an explicit request for such recommendations, or automatically based on factors such as a potential gift giver for the recipient having been warned about a gift purchase for the recipient.

In some embodiments, the AGR system may use tracked item purchase information and/or other information about items and recipients to determine whether a specified item is appropriate for a specified recipient. In particular, the optional Item Appropriateness Checker component 249 can receive an indication of an item and of a potential recipient, can retrieve a variety of types of related information, and can then use the retrieved information to determine whether the indicated item is appropriate for potential recipient. In some embodiments, the Item Appropriateness Checker component functions by itself (e.g., receiving explicit requests from clients and giving replies), while in other embodiments the Item Appropriateness Checker component may work in conjunction with an item purchase service during the placing of an order by a purchaser. In yet other embodiments, the Item Appropriateness Checker component may work in conjunction with the Item Receipt Checker and/or the Item Recommender components, such as by using information about previous or pending purchases of the item to assist in determining whether an item is appropriate, or by checking items selected by the Item Recommender component as gift recommendations to ensure that the selected gifts are appropriate.

Those skilled in the art will appreciate that computer systems 200 and 250 are merely illustrative and are not intended to limit the scope of the present invention. For example, the AGR system may be stored as instructions on a computer-readable medium, such as a hard disk, memory, or portable article to be read by an appropriate drive. Similarly, the data structures of the AGR system may also be stored on a computer-readable medium. Moreover, the AGR system instructions and data structures can also be transmitted as generated data signals on a variety of transmission mediums, including wireless-based and wired/cable-based mediums. In addition, the illustrated computer systems may contain additional components not shown (e.g., various standard I/O devices) or may lack some illustrated components, and computer system 200 may be connected to a variety of other devices through a network, through the Internet, or via the World Wide Web (WWW). Moreover, while the display 211 can be used to indicate various warnings to a user or to indicate to a user whether an item is determined to be appropriate, a variety of other user notification mechanisms can be used. Accordingly, the present invention may be practiced with other computer system configurations.

Figure 3A:
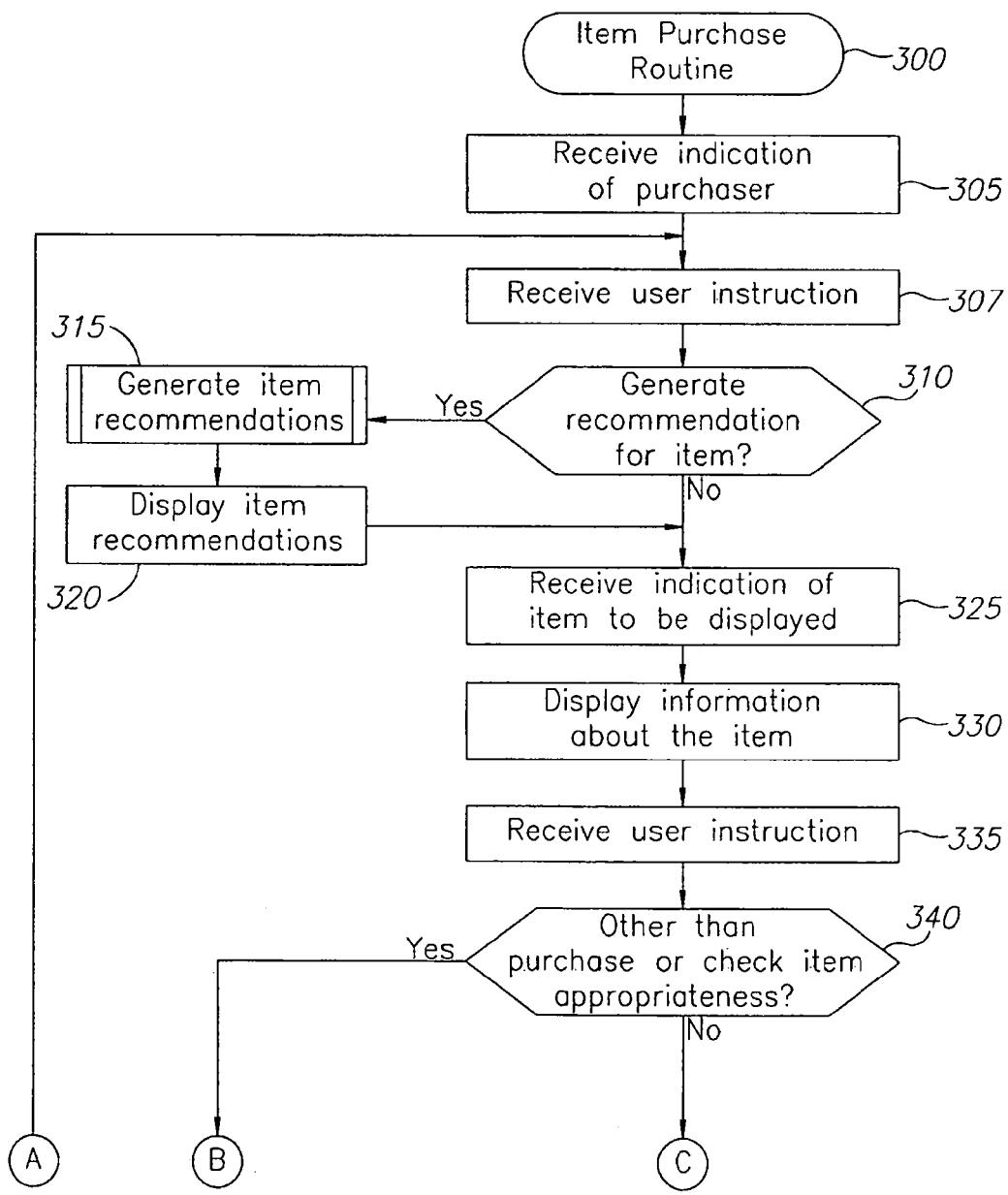
FIG. 3 is a flow diagram of an embodiment of the Item Purchase routine.
Figure 3B:
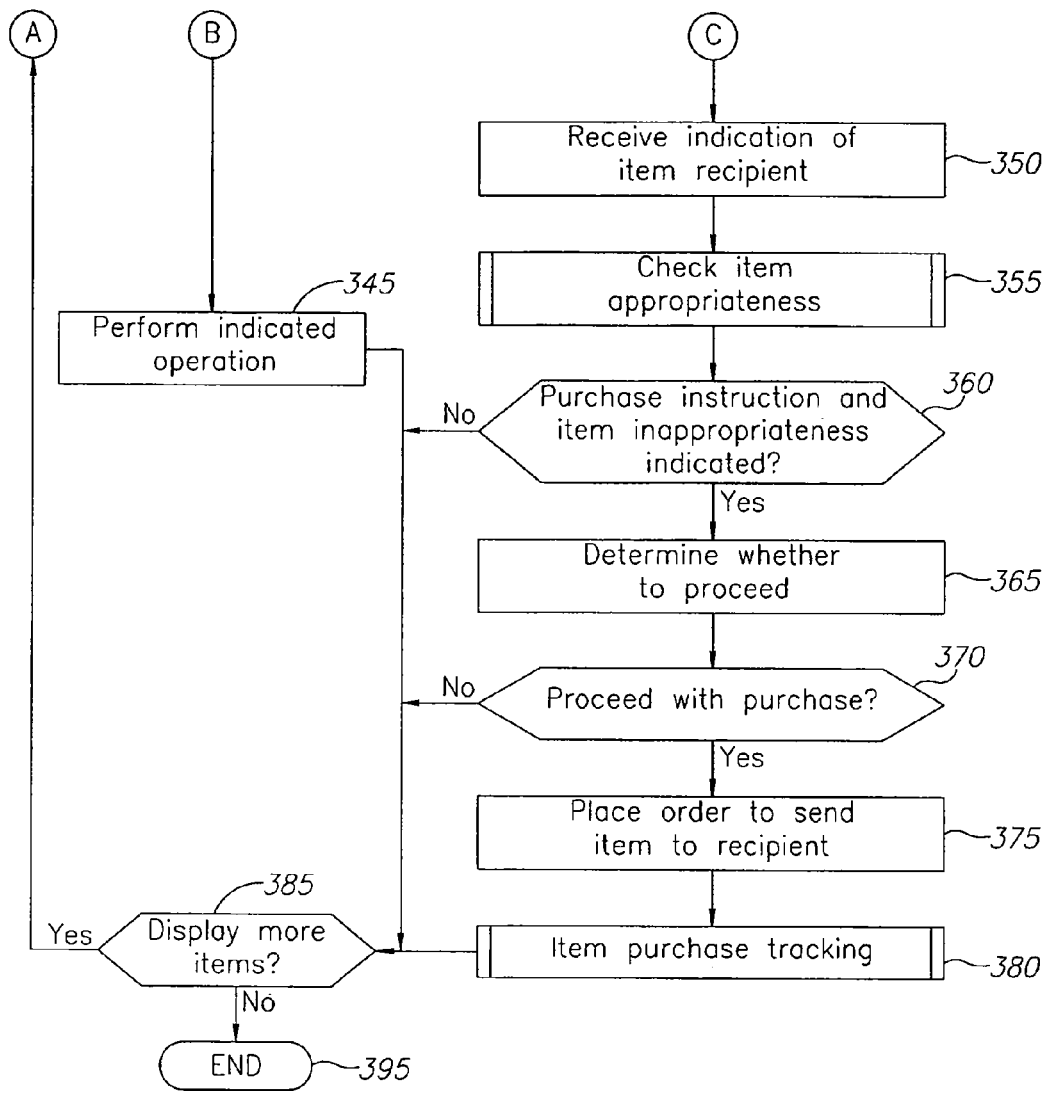

FIG. 3 is a flow diagram of an embodiment of the Item Purchase routine 300. The routine is executed when a user indicates a potential interest in purchasing an item, and it provides a variety of automated gift registry functionality to the user. The routine could be performed by the AGR system, or by an item purchase service working in conjunction with the AGR system.

The routine begins at step 305 where an indication is received of a user who is a potential purchaser. The routine continues to step 307 to receive a user request to either display information about an item to potentially be purchased, or to instead generate item gift recommendations for a potential recipient. The routine continues to step 310 to determine if the user has indicated to receive gift recommendations. If so, the routine continues to step 315 to execute the Generate Item Recommendations subroutine. After step 315, the routine continues to step 320 to display the recommended items to the user. After step 320, or if it was instead determined in step 310 that the user did not request gift recommendations, the routine continues to 325 to receive an indication from the user of a potential item to be purchased. The routine then continues to step 330 to display information about the item to the user. The routine next receives an additional user instruction in step 335 that is related to the displayed item, and continues to step 340 to determine if the instruction was either to purchase, the item or to check whether the item is appropriate for a potential recipient.

If it is determined in step 340 that the user instruction was neither to purchase the item or to determine item appropriateness, the routine continues to step 345 to perform the indicated operation. If it was instead determined in step 340 that the user instruction was either to purchase the item or to determine item appropriateness, the routine continues to step 350 to receive an indication of a potential item recipient. The routine then continues to step 355 to execute the Check Item Appropriateness subroutine during which an indication of the item appropriateness is presented to the user. The routine next continues to step 360 to determine if the instruction received in step 335 was to purchase the item or to determine item appropriateness. If it is determined in step 360 that the instruction was to purchase the item and the Check Item Appropriateness subroutine warned the user about the inappropriateness of the item, the routine continues to step 365 to determine whether to proceed with the purchase (e.g., by presenting to the user an option of whether or not to proceed with the purchase despite the warning, and receiving a user response). At step 370, the routine determines whether to proceed. If so, the routine continues to step 375 to place an order to send the item, to the specified recipient. After the order is placed, the routine continues to step 380 to execute the Item Purchase Tracking subroutine.

After steps 345 or 380, or if it was instead determined in step 360 that the instruction was to check item appropriateness or in step 370 not to proceed with the purchase, the routine continues to step 385 whether to receive more instructions from the user. If so, the routine returns to step 307, and if not the routine continues to step 395 and ends.

Those skilled in the art will appreciate that in other embodiments, some of the types of automated gift registry functionality may not be available (e.g., determining whether an item is appropriate for a recipient), or that additional types of gift registry functionality may be available (determining whether a recipient has previously received an item).

Figure 4:
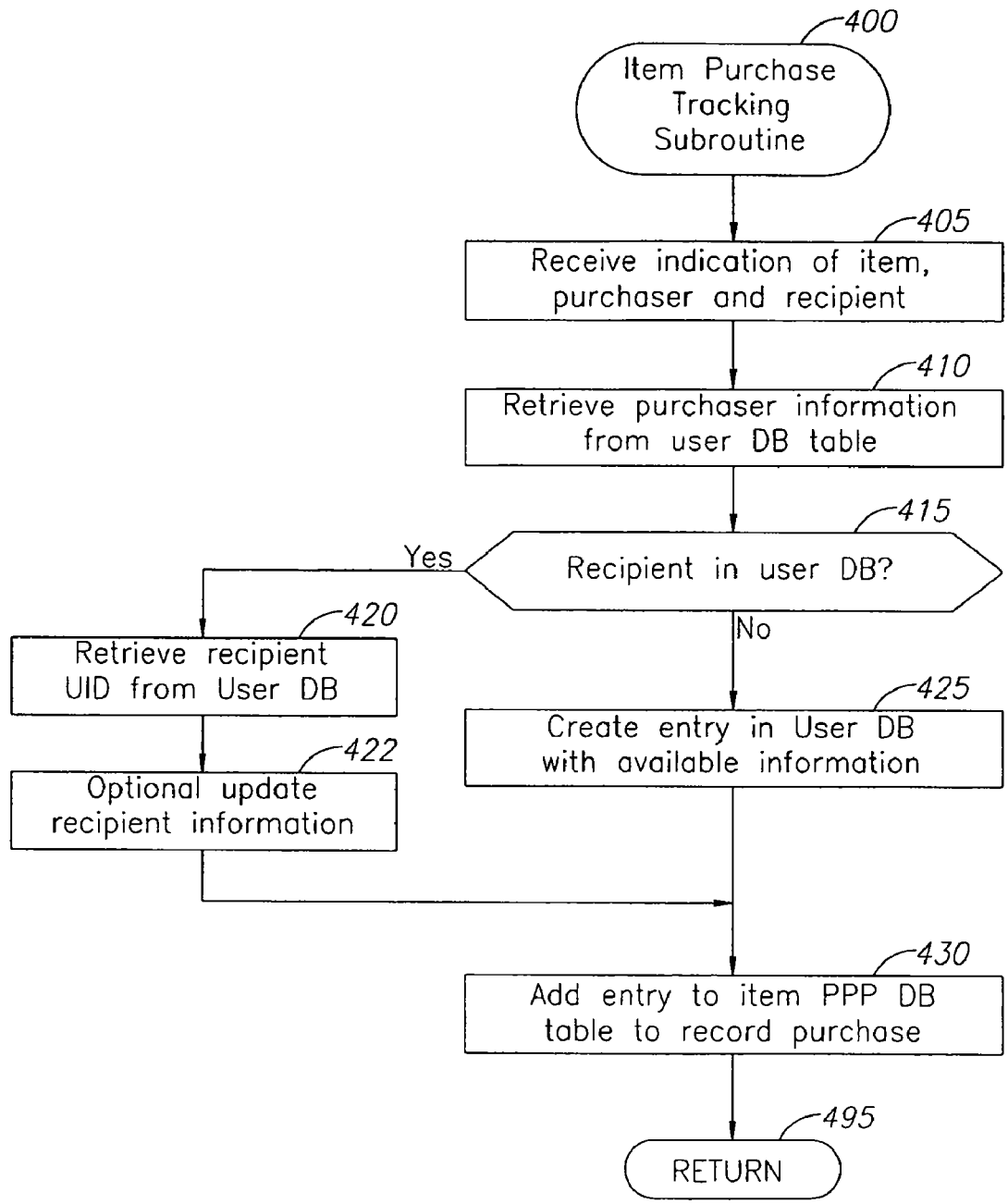
FIG. 4 is a flow diagram of an embodiment of the Item Purchase Tracking subroutine.

FIG. 4 is a flow diagram of an embodiment of the Item Purchase Tracking subroutine 400. The subroutine receives an indication of an item purchase, and retrieves and stores relevant information about the purchase. The subroutine begins at step 405 where it receives an indication of the item to be purchased, of the purchaser, and of the recipient. The subroutine then continues to step 410 to retrieve information about the purchaser from the User DB table. In the illustrated embodiment, information about the purchaser will be present in the User DB table since the purchaser is a registered user of the item purchase service and the relevant information about the purchaser is obtained during the registration process. However, the recipient of the item does not have to be a registered user, and thus information may not be yet available about the recipient. Thus, in step 415, the subroutine next determines if information about the recipient is included in the User DB table.

Those skilled in the art will appreciate that currently available information about the current recipient can be matched to the User DB table in a variety of ways to determine if information about the recipient is already present in the table. For example, if unique information about the recipient is known (e.g., an email address or Social Security number), that information alone could be checked against the User DB table. Alternately, in some circumstances a combination of multiple different pieces of available information about the recipient may be unique (e.g., full name together with home shipping address). If so, such information about the recipient (e.g., name and address) can be compared to the entries in the User DB table.

If information about the recipient is present in the User DB table, the subroutine continues to step 420 to retrieve the recipient's UID from the User DB table. The subroutine then continues to step 422 to optionally update the User DB table with any new recipient information that is available as part of the current item purchase (e.g., a shipping address specified for the current order). If it was instead determined in step 415 that information about the recipient is not present, the subroutine continues to step 425 where it creates an entry in the User DB table for the recipient (and creates a UID for the recipient), and adds any available information about the recipient to the entry. After step 422 or step 425, the subroutine continues to step 430 to add an entry to the Item PPP DB table in which various information about the item purchase is entered (e.g., the purchaser UID, recipient UID, item UID, and time of purchase). After step 430, the subroutine continues to step 495 and returns.

Figure 5:
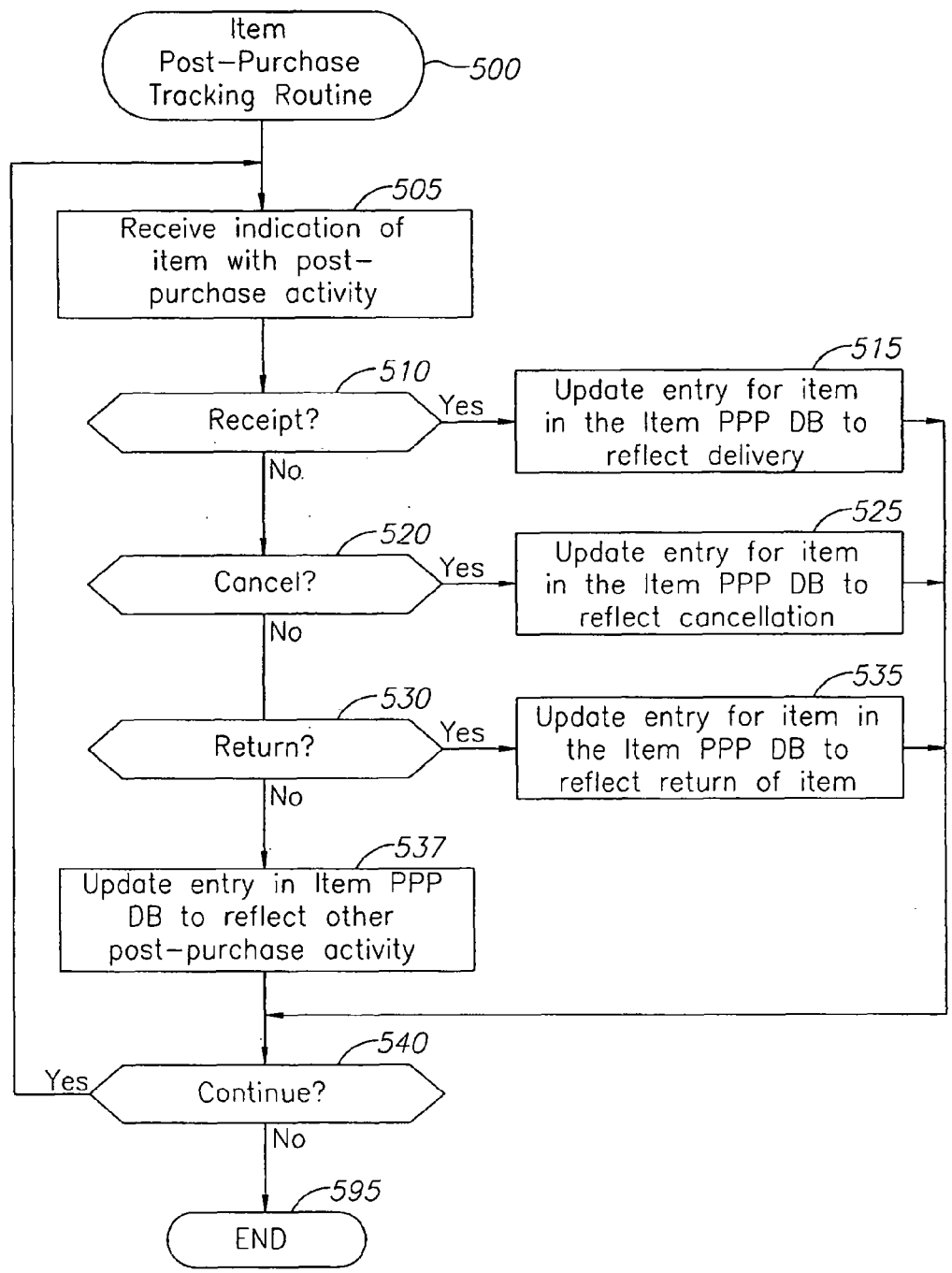
FIG. 5 is a flow diagram of an embodiment of the Item Post-Purchase Tracking routine.

FIG. 5 is a flow diagram of an embodiment of the Item Post-Purchase Tracking routine 500. The routine receives indications of various post-purchase activity for previously purchased items, and stores information about the activities in the Item PPP DB table. The routine begins at step 505 where receives an indication of post-purchase activity for a previously purchased item. The routine continues to step 510 to determine if the activity is the item being delivered to the recipient, with the recipient thus receiving the item. If so, the routine continues to step 515 to updates the entry in the Item PPP DB table for the previously purchased item to reflect the delivery. If it was instead determined in step 510 that the activity is not receipt of an item, the routine continues to step 520 to determine if the activity is cancellation of an order for an item. If so, the routine continues to step 525 where it updates the entry in the Item PPP DB table for the previously purchased item to reflect the cancellation of the order. If it was instead determined in step 520 that the activity is not cancellation of an order, the routine continues to step 530 to determine if a previously delivered item was returned. If so, the routine continues to step 535 where it updates the entry in the Item PPP DB table for the previously purchased item to reflect the return of the item. If it was instead determined in step 530 that the activity is not return of an item, the routine continues to step 537 to updates the entry in the Item PPP DB table for the previously purchased item to reflect the other type of post-purchase activity detected. After steps 505, 525, 535, or 537, the routine continues to step 540 to determine whether to continue tracking post-purchase activities. If so, the routine returns to step 505, and if not the routine continues to step 595 and ends.

Figure 6A:
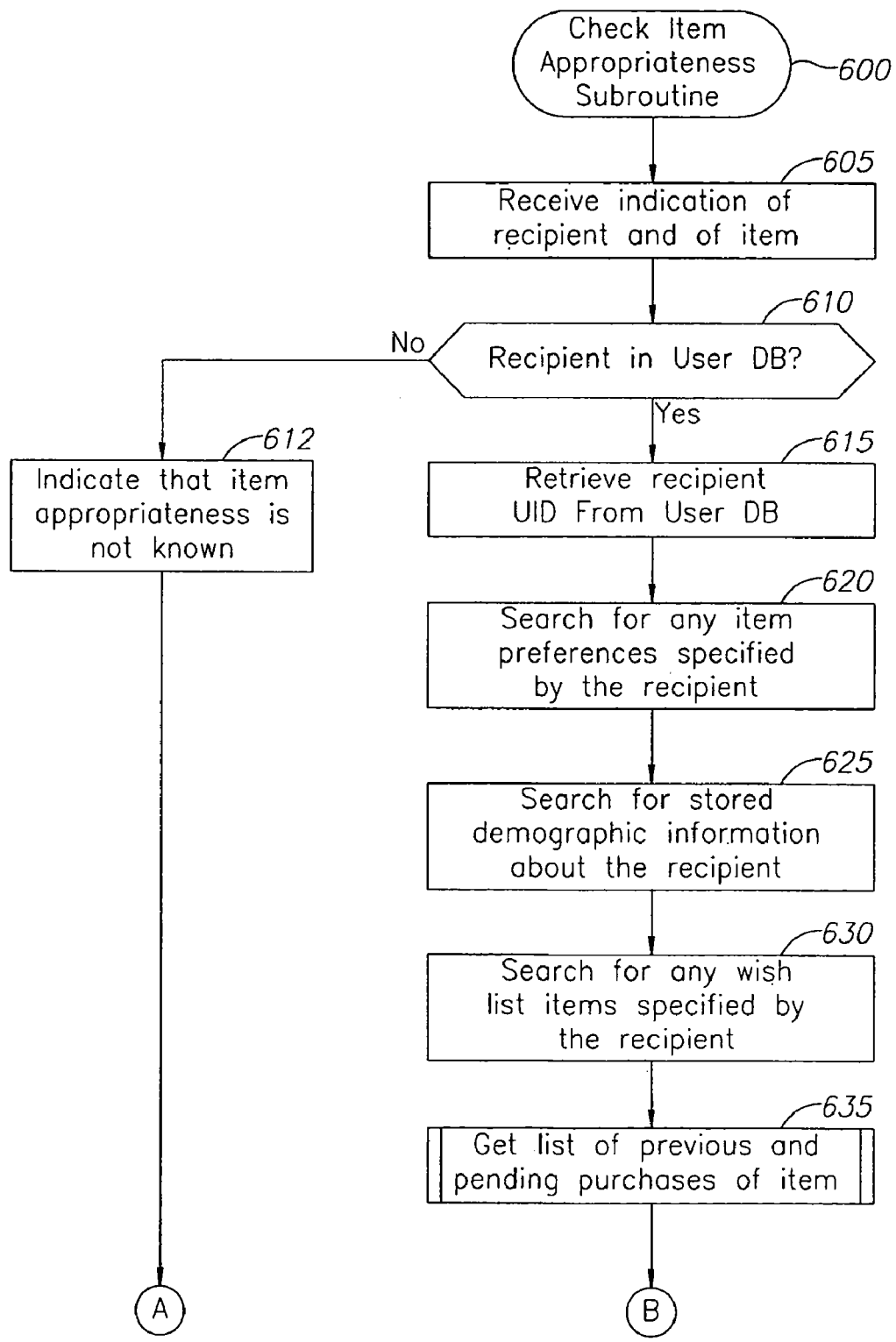
FIG. 6 is a flow diagram of an embodiment of the Check Item Appropriateness subroutine.
Figure 6B:
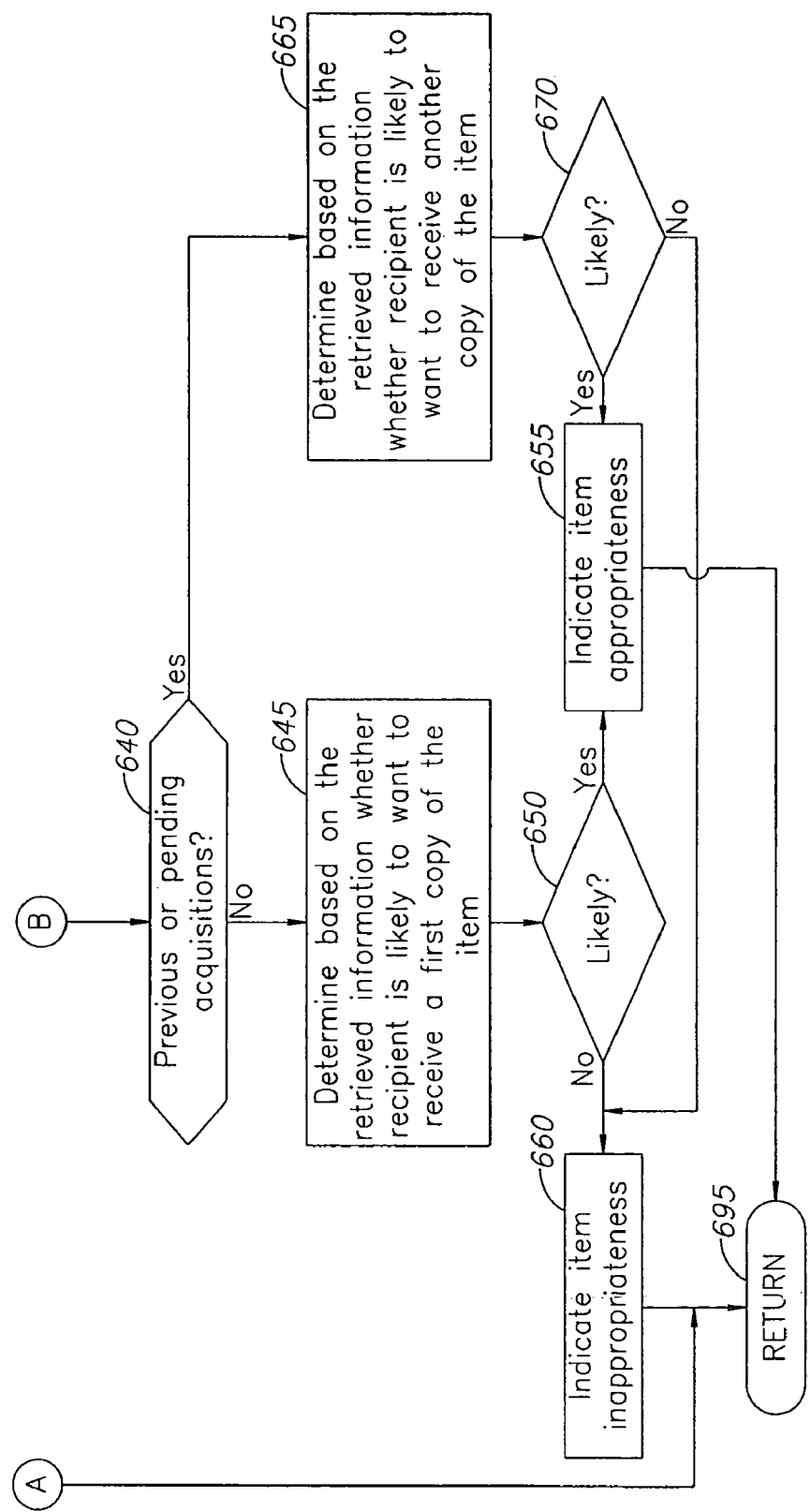

FIG. 6 is a flow diagram of an embodiment of the Check Rein Appropriateness subroutine 600. The subroutine receives an indication of an item and recipient, determines whether the item is appropriate for the recipient, and provides various warnings depending on the appropriateness determined. The subroutine begins in step 605 where an indication of the recipient and the item is received. The subroutine continues to step 610 to determine if information about the recipient is included in the User DB table. In the illustrated embodiment, information about the recipient will be present in the table if the recipient has previously received any items or if other information about the recipient (e.g., recipient preference information or demographic) information) is available. Without any such information, the illustrated embodiment of the subroutine does not check for item appropriateness, although those skilled in the art will appreciate that item appropriateness could be checked in other embodiments without such information using other techniques. Thus, if it is determined in step 610 that information about the recipient is not in the User DB table, the subroutine continues to step 612 where it indicates that item appropriateness is not known.

If it was instead, determined in step 610 that information about the recipient is present in the User DB table, the subroutine continues to step 615 where it retrieves the recipient's UID from the User DB table. The subroutine then continues to step 620 where it searches for any item preferences specified by the recipient, such as types of items of interest (e.g., books but not CDs, or sports-related information but not science fiction). The subroutine next searches for any demographic information about the recipient in step 625. In step 630, the subroutine searches for any wish list items specified by the recipient. The subroutine then continues to step 635 to execute the Get List Of Previous And Pending Purchases Of Item for the recipient subroutine.

In step 640, the subroutine next determines whether any such previous of pending purchases of the item for the recipient were identified by executing the subroutine in step 635. If not, the subroutine continues to step 645 to determine whether the recipient is likely to want to receive a first copy of the item, using the retrieved information about the user item preferences, demographic information, and wish list items as part of the determination. The subroutine then continues to step 650 to determine if it is likely that the recipient would like to receive the item. If so, the subroutine continues to step 655 to indicate the appropriateness of the item as a gift for the recipient, and if not the subroutine continues to step 660 to indicate that the item is likely to be inappropriate for the recipient.

If it was instead determined in step 640 that one or more previous or pending orders of the item for the recipient have occurred, the subroutine continues to step 665 to determine whether the recipient is likely to want to receive another copy of the item, with the determination made using not only the information used in step 645 but also information about the whether another copy of the item is likely to be wanted (e.g., based on the type of the item, the recentness of the last order for the item, etc.). After step 665, the subroutine continues to step 670 to determine whether it is likely that the recipient would like to receive another copy of the item. If so, the subroutine continues to step 655, and if not the subroutine continues to step 660. After steps 612, 655 or 660, the subroutine continues to step 695 and ends.

Those skilled in the art will appreciate that the determinations of whether the user is likely to want to receive a first or another copy of an item can be made in a variety of ways. For example, in some embodiments additional types of information may be available when making the determination, and in other embodiments some of the types of information shown may not be used. In addition, in some embodiments, a particular type of information make control the decision if it is available (e.g., an explicit user preference or a pending receipt of the item), while in other embodiments each type of available information will be factored into the decision. In one embodiment, it is assumed that a user will only want to receive one copy of an item unless the user has indicated otherwise, and thus a potential item purchase is determined to be appropriate only when there are no previous or pending orders of the item for the recipient.

Those skilled in the art will also appreciate that indications of item appropriateness or not can be made in a variety of ways. For example, in some embodiments the user may receive a warning that is presented on the user's display, with different warnings have differing amounts of related information presented to the user. In other embodiments, the indication may occur by altering the current transaction (e.g., canceling the ordering of the item that may have begun).

Figure 7A:
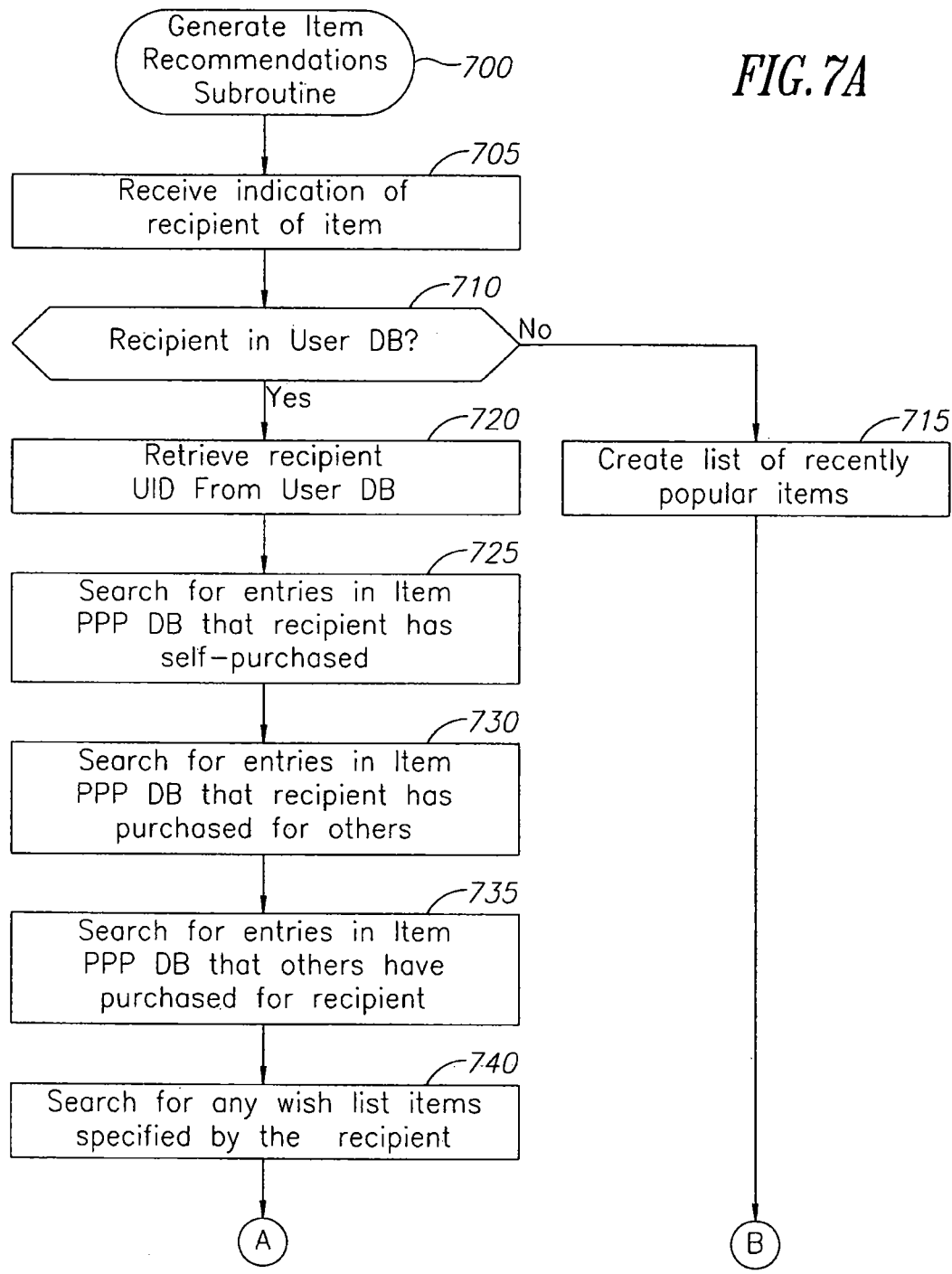
FIG. 7 is a flow diagram of an embodiment of the Generate Item Recommendations subroutine.
Figure 7B:
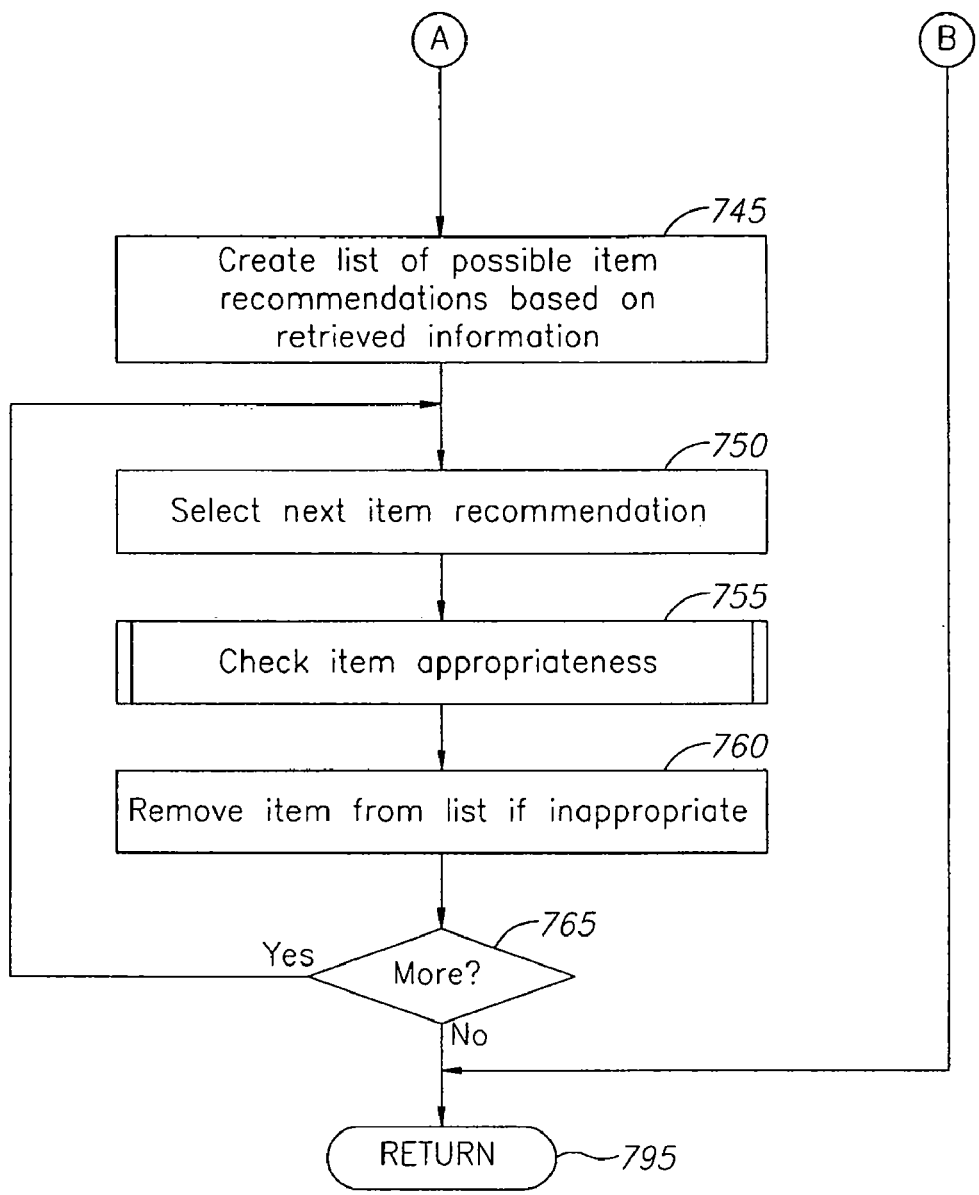

FIG. 7 is a flow diagram of an embodiment of the Generate Item Recommendations subroutine 700. The subroutine receives a request to generate gift recommendations for a recipient, gathers a variety of information about the recipient, and predicts items that are likely to be appropriate for the recipient without using any manually specified indications of appropriate items for the recipient such as a recipient-specified wish list. The subroutine begins in step 705 where it receives an indication of a potential recipient. The subroutine then continues to step 710 to determine if information about the recipient is stored in the User DB table. In the illustrated embodiment, if any information is available with which to generate recipient-specific item recommendations, then basic information about the recipient will be stored in the User DB table. Thus, if recipient information is not stored in the User DB, the subroutine continues to step 715 where it generates a list of items that have recently been popular (e.g., from a best-sellers list) to be used as potential gift recommendations.

If it was instead determined in step 710 that information about the recipient is available, the subroutine continues to step 720 where it retrieves the recipient's UID from the User DB table. The subroutine then continues to step 725 where it searches for entries in the Item PPP DB table that the recipient has acquired as self-purchases (i.e., the retrieved recipient UID matches both the purchaser UID and recipient UID for the table entry). The subroutine next continues to step 730 where it searches for entries in the Item PPP DB table that the recipient has purchased as gifts for others. In step 735, the subroutine next searches for entries in the Item PPP DB table that the recipient has received as gifts from others. The subroutine then continues to step 740 to search for any wish list items that have been specified by the recipient. At step 745, the subroutine then generates a list of possible item recommendations based on the retrieved information. For example, items on the wish list and items that the recipient has purchased for others may be selected as possible item recommendations. Similarly, items that are related to or similar to items purchased for the recipient could also be selected as possible item recommendations.

After step 745, the subroutine continues to step 750 to select the next item from the created list of possible item recommendations, beginning with the first item. In step 755, the subroutine then executes the Check Item Appropriateness subroutine to determine whether the selected item is appropriate for the recipient (e.g., if a duplicate of an item that the recipient has recently received, whether the recipient is likely to want another copy of the item). The subroutine then removes the selected item from the created list in step 760 if the item is determined to be inappropriate by the Check Item Appropriateness subroutine. The subroutine next determines in step 765 whether there are more items in the created list, and if so returns to step 750. If it is determined in step 765 that there are no more items to be selected, or after step 715, the subroutine continues to step 795 to return the current items in the created item recommendation list.

Figure 8:
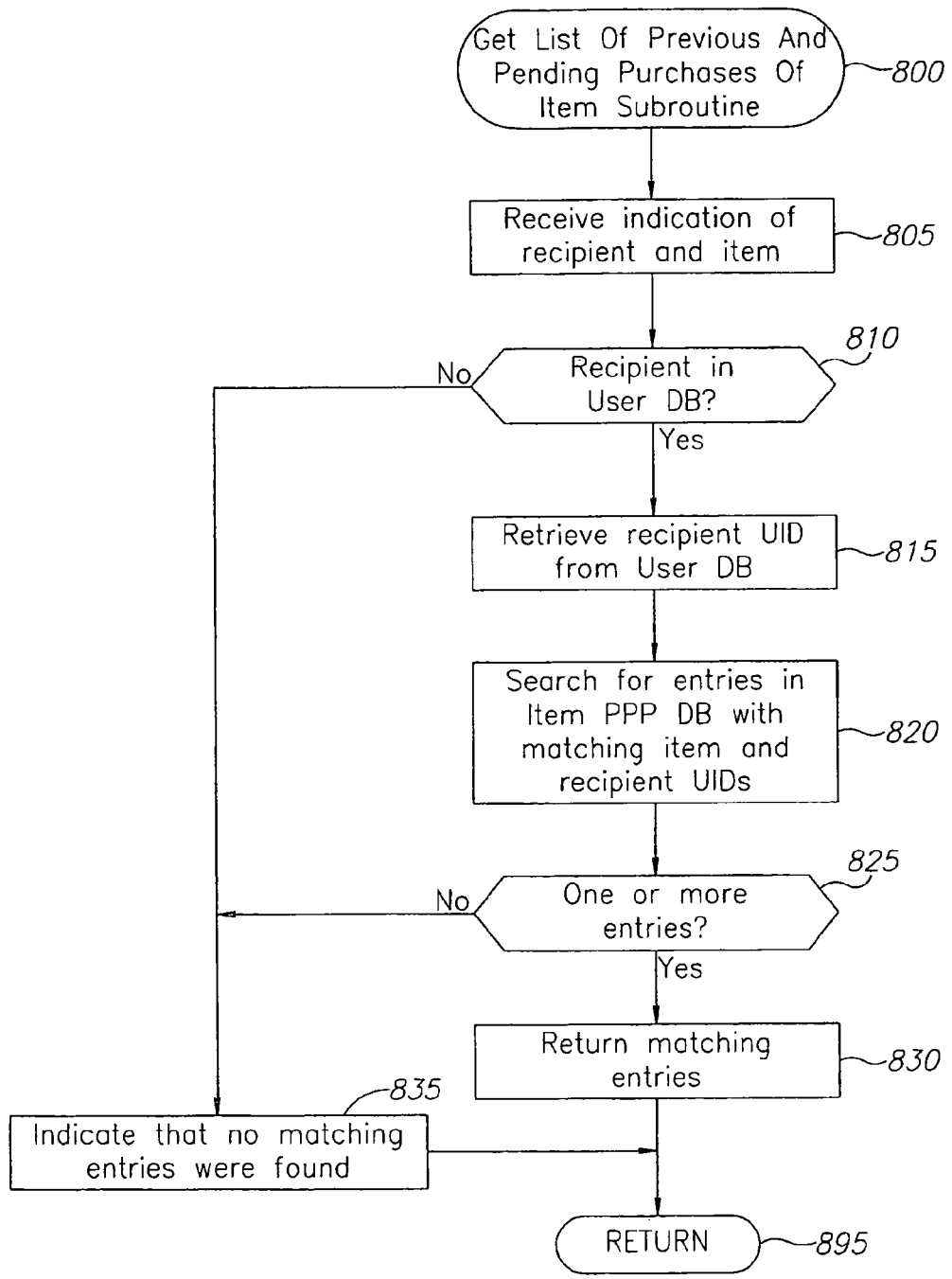
FIG. 8 is a flow diagram of an embodiment of the Get List Of Previous And Pending Purchases Of Item subroutine.

FIG. 8 is a flow diagram of an embodiment of the Get List Of Previous And Pending Purchases Of Item subroutine 800. The subroutine receives an indication of an item and recipient, determines whether the recipient has previously received the item and whether an order is pending through which the recipient will receive the item, and indicates whether any such previous or pending purchases were identified. The subroutine begins in step 805 where an indication of the recipient and item is received. The subroutine continues to step 810 to determine if information about the recipient is included in the User DB table. If information about the recipient is not included, the subroutine continues to step 835 to indicate that no such previous or pending purchases of the item for the recipient were identified.

If it was instead determined in step 810 that information about the recipient is present in the User DB table, the subroutine continues to step 815 where it retrieves the recipient's UID from the User DB table. The subroutine then continues to step 820 where it searches for entries in the Item PPP DB table that have item and recipient UIDs that match the retrieved recipient UID and received item UID. While the item UID is received in step 805 in the illustrated embodiment, those skilled in the art will appreciate that if other information that uniquely identifies the item was instead received in step 805, the item UID for the item could be retrieved from the Item DB table using that information in a manner similar to that for the recipient UID. After step 820, the subroutine continues to step 825 where it determines whether one or more matching entries were found in the Item PPP DB table. If not, the subroutine continues to step 835, and if so the subroutine continues to step 830 to return an indication of the previous and pending purchases of the item for the recipient that were identified. After steps 830 or 835, the subroutine continues to step 895 and returns.

Those skilled in the art will appreciate that a variety of changes can be made within the spirit of the described invention to the above-described examples. For example, although the AGR system is described in some embodiments as separate from item purchase services, in other embodiments an AGR system may be a component or piece of such a service. Similarly, while the AGR is described as tracking information about item purchases, those skilled in the art will appreciate that in some embodiments the AGR system may instead receive such information from an external source, and then use that received information to make gift recommendations and to check for previous and pending receipt of items.

From the foregoing it will be appreciated that, although specific embodiments have been described herein for purposes of illustration, various modifications may be made without deviating from the spirit and scope of the invention. Accordingly, the invention is not limited except as by the appended claims.

The invention claimed is:

1. A computer-implemented method, comprising:
    tracking, by one or more programmed computer systems, information about a plurality of item acquisitions performed by multiple users for multiple recipients;
    after a user initiates at a first time an acquisition for a first recipient of an item that is specified by the user, identifying, by the one or more programmed computer systems, from the tracked information that the item has previously been acquired for the first recipient;
    determining, by the one or more programmed computer systems, that the initiated acquisition of the item is not appropriate, the determining being based on the identifying from the tracked information and being performed without consideration of any manually specified indication from anyone at any time prior to the first time of whether the item is appropriate to be acquired for the first recipient; and
    indicating to the user, by the one or more programmed computer systems, not to complete the initiated acquisition based on the determining that the initiated acquisition of the item is not appropriate.

2. The method of claim 1 wherein if the user is the first recipient, the indicating not to complete the acquisition is performed only if the item previously acquired for the first recipient has not yet been received by the first recipient.

3. The method of claim 1 including:
    at a second time after the user initiates a second acquisition of a second item for the first recipient, determining from the tracked information that the first recipient already has the second item; and indicating to the user to complete the second acquisition based at least in part on the determining that the first recipient already has the second item.

4. The method of claim 1 wherein the indicating to the user not to complete the initiated acquisition includes presenting a warning to the user.

5. The method of claim 1 wherein the indicating to the user not to complete the acquisition includes providing information about the previous acquisition of the item for the first recipient.

6. The method of claim 1 wherein the indicating to the user not to complete the acquisition includes querying the user for confirmation to proceed with the acquisition of the item for the first recipient.

7. The method of claim 6 including receiving a response from the user to the querying that confirms to proceed with the acquisition of the item for the first recipient, and proceeding with that acquisition based on the response.

8. The method of claim 6 wherein the indicating to the user not to complete the acquisition further includes canceling the acquisition of the item for the first recipient based at least in part on the determining unless a response is received from the user to the querying that indicates to proceed with the acquisition of the item for the first recipient.

9. The method of claim 1 wherein the identifying from the tracked information includes identifying that the item has already been acquired for the first recipient by the user.

10. The method of claim 1 wherein the user is the first recipient.

11. The method of claim 1 further comprising determining that an initiated second acquisition of a second item for the first recipient by the user is appropriate, and enabling the initiated second acquisition of the second item to be completed without providing any indication to the user.

12. The method of claim 1 further comprising determining that an initiated second acquisition of a second item for the first recipient by the user is appropriate, and providing an indication to the user that the initiated second acquisition of the second item is appropriate.

13. The method of claim 1 wherein the determining that the initiated acquisition of the item is not appropriate is additionally based on an amount of time that has elapsed since the item was previously acquired for the first recipient.

14. A non-transitory computer-readable storage medium whose contents configure a computer system to perform a method, the method comprising:

tracking, by the configured computer system, information about a plurality of item acquisitions that are each performed by a user for a recipient;

after a first user initiates at a first time a potential acquisition for a first recipient of a first item specified by the first user, determining, by the configured computer system, whether the initiated acquisition of the first item is appropriate based on whether the tracked information identifies that the first item has previously been acquired for the first recipient without consideration of any manually specified indication from anyone at any time prior to the first time of whether the item is appropriate to be acquired for the first recipient; and if the determining is that the initiated acquisition of the first item is not appropriate, providing an indication to the first user not to complete the initiated acquisition, and otherwise not providing the indication to the first user not to complete the initiated acquisition.

15. The non-transitory computer-readable storage medium of claim 14 wherein the determining includes determining that the initiated acquisition of the first item is not appropriate based on the tracked information identifying one or more previous occurrences of the first item being acquired for the first recipient, and wherein the providing of the indication to the first user not to complete the initiated acquisition includes providing information for presentation to the first user.

16. The non-transitory computer-readable storage medium of claim 15 wherein the initiated potential acquisition of the first item for the first recipient is an actual acquisition of the first item for the first recipient that is initiated by the first user but that is not completed at a time of the determining that the initiated acquisition of the first item is not appropriate.

17. The non-transitory computer-readable storage medium of claim 14 wherein the computer-readable storage medium is a memory of the computer system that stores the contents, and wherein the contents are software instructions that when executed program the computer system to perform the method.

18. A computer system, comprising:

one or more processors;

an item acquisition analysis component that is configured to, when executed by at least one of the one or more processors, and based on an indication of a potential acquisition of a first item for a first recipient by a first user, determine whether the indicated acquisition of the first item is appropriate based at least in part on whether the first item has previously been acquired for the first recipient, the determining being based on information that is tracked about prior item acquisitions for one or more recipients and being performed without consideration of any manually specified indication from anyone of whether the indicated acquisition of the first item for the first recipient is appropriate; and an item acquisition appropriateness indicator component that is configured to, if the indicated acquisition of the first item is determined not to be appropriate, provide an indication to the first user not to complete the indicated acquisition, and to, if the indicated acquisition of the first item is determined to be appropriate, enable the indicated acquisition of the first item for the first recipient to proceed.

19. The computer system of claim 18 wherein the determining includes determining that the indicated acquisition of the first item is not appropriate based on the tracked information identifying one or more previous occurrences of the first item being acquired for the first recipient, and wherein the providing of the indication to the first user not to complete the indicated acquisition includes providing information for presentation to the first user.

20. The computer system of claim 18 wherein the indicated potential acquisition of the first item for the first recipient is an actual acquisition of the first item for the first recipient that is initiated by the first user but that is not completed at a time of the determining.

21. The computer system of claim 18 wherein the item acquisition analysis component and the item acquisition appropriateness indicator component each includes software instructions for execution by the one or more processors.

* * * * *